United States Patent [19]
Castelli

[11] Patent Number: 5,355,716
[45] Date of Patent: Oct. 18, 1994

[54] GENERALIZED ROTARY SHOCK AND IMPACT TESTING MACHINE

[75] Inventor: Vittorio Castelli, Yorktown Heights, N.Y.

[73] Assignee: Automotive Technologies International, Inc., Boontown Township, N.J.

[21] Appl. No.: 531,906

[22] Filed: Jun. 1, 1990

[51] Int. Cl.⁵ ............................................. G01L 25/00
[52] U.S. Cl. ............................... 73/1 D; 73/12.01
[58] Field of Search ................ 73/1 D, 1 DC, 12, 82

[56] References Cited

U.S. PATENT DOCUMENTS

| | | | |
|---|---|---|---|
| 2,301,967 | 11/1942 | Nosker et al. | 73/1 D |
| 2,496,298 | 2/1950 | Mackas | 73/12 |
| 2,907,201 | 10/1959 | Keener | 73/12 |
| 3,180,131 | 4/1965 | Thompson | 73/1 DC |
| 3,545,251 | 12/1970 | Munn | 73/12 |
| 3,583,205 | 6/1971 | Erle | 73/1 D |
| 3,745,832 | 7/1973 | Johnson | 73/1 DC X |
| 4,546,654 | 10/1985 | Isherwood et al. | 73/12 X |

FOREIGN PATENT DOCUMENTS

| | | | |
|---|---|---|---|
| 0148231 | 9/1982 | Japan | 73/12 |
| 1296217 | 11/1972 | United Kingdom | 73/12 |

OTHER PUBLICATIONS

Juhasz et al, "Computer Velocity Control of a Sled Used in Impact Studies", Conf: Instrumentation in the Aerospace Industry, vol. 17, Proceedings of the 26th International Instrumentation Symposium, May 1980, pp. 393–404.

Primary Examiner—Donald O. Woodiel
Attorney, Agent, or Firm—Sprung Horn Kramer & Woods

[57] ABSTRACT

This invention relates to a shock and impact testing apparatus for subjecting items under test, such as a motor vehicle crash sensor, to an acceleration pulse of a prescribed amplitude and shape, such as a half sine or haversine. The apparatus includes a stationary support providing a pivot point, a swivel arm mounted for rotational movement about the pivot point and an electric motor, arranged on the stationary support and mechanically coupled to the swivel arm, for rotating the swivel arm at a desired, prescribed speed. The arm has a free end for the attachment of the test object so that the test object is moved at the prescribed speed along a given path. A mechanical spring is arranged in this path for reversing the direction of motion of the test object, thereby imparting an acceleration pulse to the test object of a prescribed shape. The spring has a plurality of characteristic modes of vibration which provide different frequencies of vibration; however, the spring is constructed to reverse the direction of motion of the test object at substantially one frequency of vibration. The apparatus can also be used for subjecting a test object to a prescribed impact.

36 Claims, 38 Drawing Sheets

GENERALIZED ROTARY SHOCK AND IMPACT TESTING MACHINE

BACKGROUND OF THE INVENTION

The present invention relates to a device or machine for subjecting a test object to an acceleration pulse of a prescribed shape and amplitude. Although initially intended for testing crash sensors used as part of an automobile air bag restraint system, the machine has more general capabilities, as will be described below.

In order to verify that crash sensors have the proper response, all crash sensors are tested during the final manufacturing process and data relative to this test is stored. The sensor testing process involves subjecting the sensor to a series of simulated crash pulses which are typically idealized as either half sine or haversine shaped acceleration time pulses. Typically, a sensor is tested with a series of six such pulses. The ball-in-tube sensors used in the crush zone for Ford and General Motors cars, for example, are all tested with haversine pulses having durations of 10, 20 and 30 milliseconds. For each duration, the sensor is subjected to a pulse where it should not trigger and a second pulse where it must trigger by a certain time period. If a sensor passes all six tests, it will meet the inspection requirements set forth and can be shipped and installed on a vehicle. If it fails any one of the six tests, the sensor will fail inspection.

A variety of devices have been used to create the pulses used for these tests. One system, for example, uses a cam consisting of a disk approximately six feet in diameter which is rotated at a constant speed. The sensor is mounted onto a cam follower and each of the test pulses is machined into the cam surface. As the cam makes one revolution, the sensor is subjected to the required series of pulses.

This cam system has largely been replaced by an electromagnetic linear actuator, referred to commercially as a "shock pulse system" which has since become the standard device for testing sensors. A typical actuator consists of a voice coil (or acoustical coil) and electromagnet combination. The device is typically approximately two feet in diameter and the voice coil is typically about six inches in diameter and about six inches long. Flux lines from the electromagnet are concentrated in a gap through which the voice coil travels. When current flows in the voice coil, a force is exerted on the voice coil which, in turn, propels an armature in a linear direction. The armature is typically about two feet long and a sensor is mounted on the opposite end of the armature from the voice coil. A computer generates the required pulse which is fed to an amplifier that creates the necessary current for driving the voice coil. The entire voice coil and armature combination weighs typically about ten to fifteen pounds. In order to create the required test pulses as much as 300 amperes of current at up to 300 volts must be supplied to the voice coil.

This current is generated by the amplifier which is normally of the switching type. The actuator device typically weighs about 2,000 pounds. In addition, ancillary equipment is required to cool the device to prevent overheating. Testing devices of a design similar to that described above can be purchased commercially at a price in excess of $100,000.

Test equipment such as the actuators described above are a required component in the manufacturing of ball-in-tube crash sensors such as disclosed in Breed U.S. Pat. No. 4,329,549. This equipment has been reported to be the least reliable device on the manufacturing line. In particular, the pulses created by the actuating devices have been found to vary between individual devices and over time, and are a function of temperature. Thus, sensors which pass a test on one actuating device might fail the test on the same device at a different time or on a different device.

Crash sensor test device problems have many causes, but primarily are related to the fact that a test device does not inherently produce a perfect haversine or half sine pulse. The computer specifies a pulse to the amplifier which creates the current which drives the voice coil at one end of the armature. Accelerometers at the other end measure the resulting pulse and the computer compares this pulse with the desired pulse and modifies or corrects the pulse that it sends to the amplifier. This process is repeated until the accelerometer pulse is judged satisfactory. Usually substantial filtering of the output pulse is required before a comparison can be made. This is due to the fact that there are many factors which influence the signal received from the accelerometer which are random in nature and therefore cannot be corrected by modification of the computer generated pulse.

The problem begins with the fact that accelerometers themselves are typically only accurate to approximately 1%. The signal from the accelerometers passes through a thin wire which must travel with the accelerometer as it moves approximately 12 inches during each pulse. Although care is taken to shield the accelerometer wires from stray electromagnetic fields, this has been only partially successful. In particular, the switching amplifiers used to supply current to the voice coil are noisy and radiate a large amount of energy at the switching frequency. The voice coil itself acts as an antenna radiating high frequency oscillations from a point inches away from the accelerometers.

The voice coil provides a force at one end of a long armature. The sensor to be tested and the accelerometers are at the other end of this armature. The armature has many natural frequencies, one of which is typically around 1,000 Hertz. Thus, there is a time delay between the time that current flows through the voice coil and accelerates one end of the armature and the time that the accelerometers sense the acceleration at the other end. Any acceleration to one end of the armature excites natural frequencies in the armature which are superimposed upon the desired pulse. In addition the armature typically is supported by rolling element bearings which also excite vibrations in the armature. This is caused by the rollers themselves and is compounded by roughness on the surfaces on which the bearings roll. This, in turn, can be caused by dirt which can attach onto these surfaces.

There are many other forces which effect the motion of the armature and which cause the actual pulse to deviate from the desired pulse. These include variations in the weight of the sensor being tested, the tension of the wires which carry the information from the moving sensor to the data acquisition system, and the copper bands which carry the current to the voice coil.

The natural frequency associated with the armature as mentioned above induces a significant lag between the time that the current flows to the voice coil and the time that acceleration is measured by the accelerometers. It is therefore not practical to use feedback to correct the pulse. This substantially exacerbates the problem since either wide tolerances on the acceptable pulse must be permitted or a feed forward correction must be made and the pulse rerun. This is particularly complicated in at least one brand of sensor tester where the correction process is done through a complicated mathematical procedure involving the use of fast Fourier transforms. For this particular actuating device, the force on the voice coil is dependent upon the location and the velocity of the voice coil, thus to achieve a certain acceleration, a different current is required depending on the exact position and motion of the voice coil. This particular testing device design, although capable of providing more accurate haversine acceleration pulses, requires as much as 40 seconds to run a series of six pulses. This requires either that multiple sensors be run simultaneously on the test device or that multiple test devices be used on a production line. In an alternate design of this test device, this cycle takes place in approximately five seconds, however, the accuracy and repeatability of the pulse is considerably compromised.

Test devices are designed to test sensors of widely varying requirements. For example, a standard crush zone sensor might require a 13 mile per hour test pulse with a duration of 10 milliseconds, resulting in a peak acceleration of approximately 100 G's, whereas a safing or arming sensor may require a 30 millisecond pulse of 1.3 mile per hour with a peak acceleration of about 2.5 G's. Test devices which have been designed to achieve the higher pulse have a great deal of difficulty accurately repeating the smaller pulse. The result has been that very wide manufacturing tolerances are required for arming sensors to compensate for the inability of current testing devices to test the sensor accurately.

In summary, devices currently being used to test crash sensors are relatively inaccurate primarily because of their inability to generate a clean, accurate acceleration pulse. They are large, heavy and expensive. These problems inherently stem from the use of a linear actuator as the fundamental actuating device and the use of an electromagnet to generate an acceleration pulse.

Another application of the present invention is in the testing of complete vehicle occupant restraint systems. With the rapidly increasing concern for automobile safety, there is a greater and greater need for devices to test various occupant restraint system designs. Full scale car crashes are expensive and as a result most testing in done on a sled which simulates a car crash using a portion of the car interior, referred to as a "vehicle buck" which is either accelerated or decelerated to achieve the desired crash pulse. The sled usually rides on rails and is quite large taking up to 140 linear feet of floor space. The cost of such sleds is also quite high and this is especially so for sleds which are capable of achieving the higher velocities which will be required as cars are designed for higher velocity impacts.

SUMMARY OF THE INVENTION

A principal object of the present invention, therefore, is to provide an improved apparatus, referred to herein as a "test device", for subjecting a test object, such as a motor vehicle crash sensor, to an acceleration pulse of a prescribed amplitude and a prescribed shape, such as a half sine.

Another object of this invention is to provide a low cost test device for the production testing of motor vehicle crash sensors.

Still another object of this invention to provide a low cost sled for occupant restraint system testing which is capable of high velocity impacts and occupies a minimum of floor space.

Yet another object of this invention is to provide a general purpose impactor device for material testing.

Another object of this invention is to provide a spring design for a test device which produces a very accurate acceleration pulse.

Still another object of this invention is to provide a test device which is capable of cross-axis vibration simultaneously with the longitudinal acceleration pulse.

These objects, as well as others which will become apparent from the discussion which follows, are achieved, according to the present invention, by providing a stationary support that forms a pivot point; a swivel arm mounted for rotational movement about the pivot point; and an electric motor, arranged on the stationary support and mechanically coupled to the swivel arm, for rotating the swivel arm at a desired, prescribed speed. With this arrangement a test object, such as an air bag crash sensor, may be mounted either on the free end of the swivel arm, for movement therewith, or on the stationary support in the path of movement of the arm. In this way, the test object may be impacted against a stationary object, such as a spring or a rubber stop, or it may be impacted by the free end of the moving swivel arm, respectively, to apply a prescribed acceleration pulse thereto.

According to a particular preferred embodiment of the present invention, the test object is attached to the free end of the swivel arm so that the test object is moved at the prescribed speed along a given path. A stationary mechanical spring is arranged in this path for reversing the direction of motion of the test object, thereby imparting to the test object an acceleration pulse of a prescribed shape.

Further features, objects and advantages of the present invention will become apparent from the following description taken in conjunction with the accompanying drawings.

DESCRIPTION OF THE PREFERRED EMBODIMENTS

Figure 1:
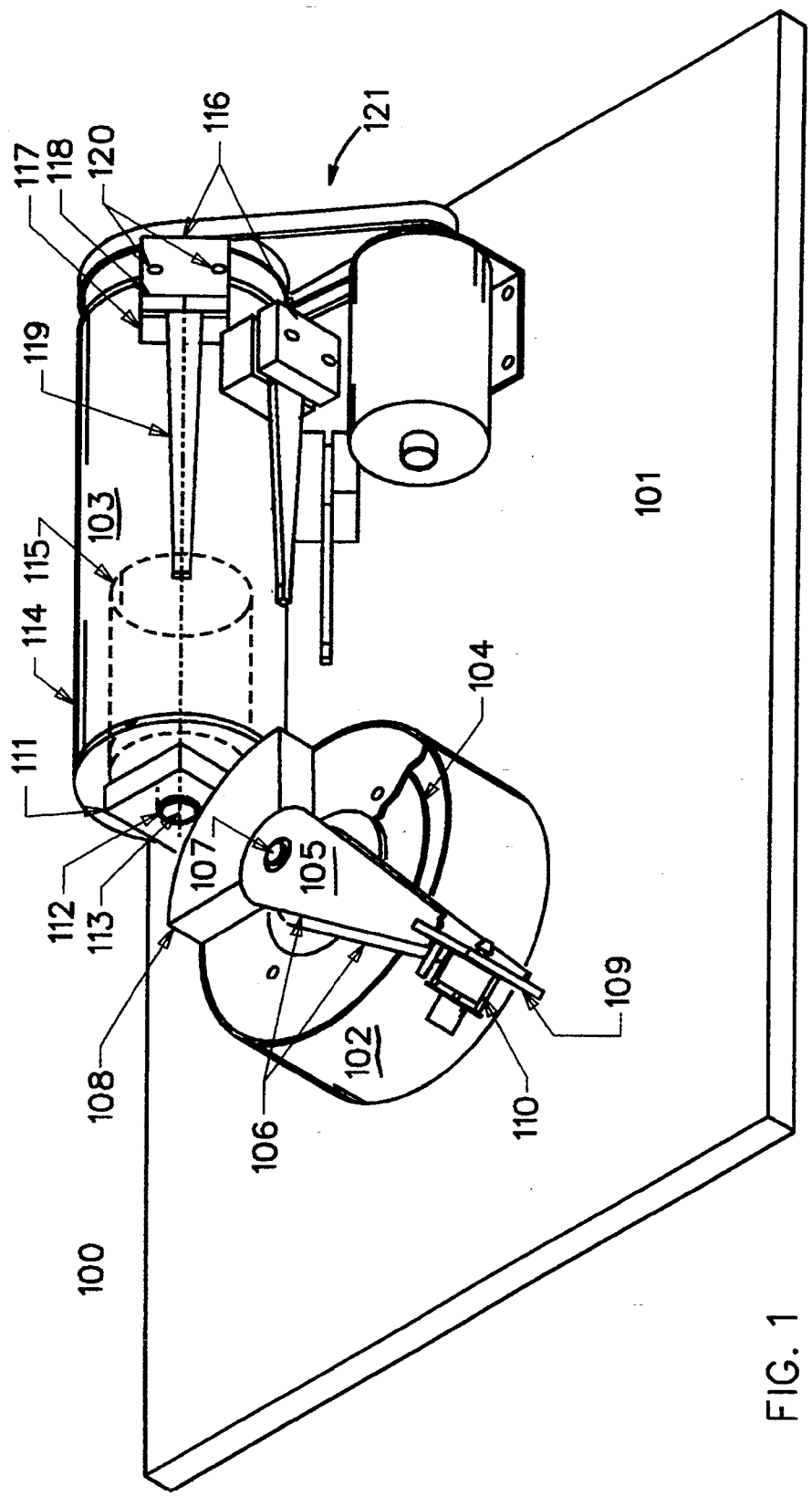
FIG. 1 is a perspective view of a preferred embodiment of a rotary test device according to this invention.

FIG. 1 shows a perspective view of a sensor test device designed according to the teachings of this invention. The device is shown generally as 100 and consists of a table 101 upon which is mounted a rotary actuator 102 and a spring support mechanism 103. The rotary actuator 102 consists of a servo motor 104 and a swivel arm 105. The arm consists of two supports 106, which attach to the shaft 107 of the servo motor 104. The supports 106 support a counterweight 108 and a sensor support platform 109. Mounted on the platform 109 is the sensor 110 to be tested.

The spring support mechanism 103 consists of two vertical supports 111 into which are mounted two bearings 112, which in turn support a shaft 113. Mounted on the shaft is a cylinder 114 and internal to cylinder 114 is a seismic weight 115. Mounted on the outside of cylinder 114 are a plurality of spring assemblies 116. Each spring assembly consists of two mounting blocks 117 and 118 and a cantilevered spring 119. The entire spring assembly is fastened together by bolts 120 which attach it to cylinder 114.

Figure 2:
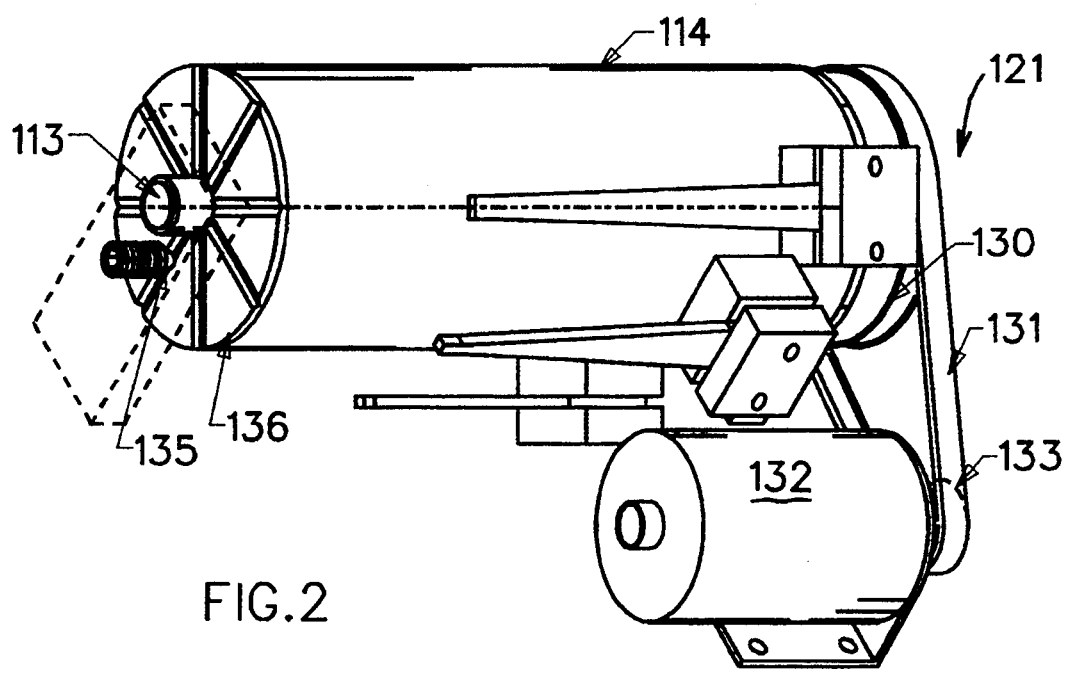
FIG. 2 is a detailed prespective view of the spring positioning cylinder and drive mechanism in the test device of FIG. 1.
Figure 3:
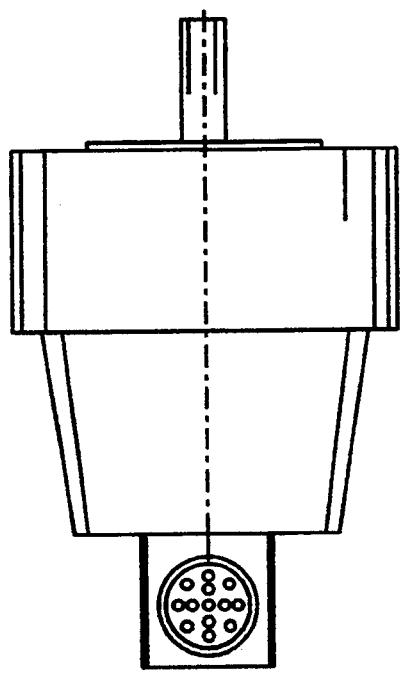
FIG. 3 is a detailed side view of the servo motor in the test device of FIG. 1 showing the encoder.

As shown in detail in FIG. 2, a cylinder positioning mechanism 121 rotates cylinder 114 about bearings 113 so as to position each of the springs 119 into alignment with the center of sensor mounting plate 109 and sensor 110 (as shown in FIG. 1). This rotation is accomplished by a gear belt 131, a small servo motor 132, and two gear pulleys 130 and 133.

Figure 5:
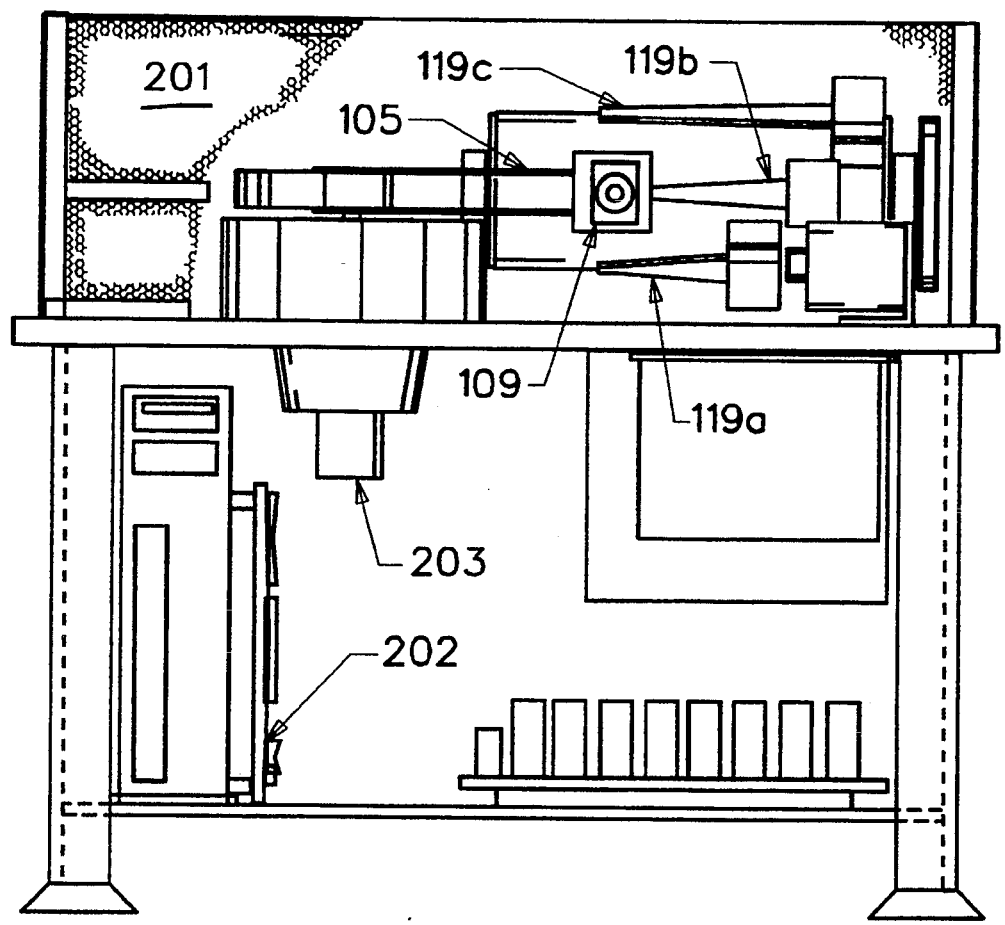
FIG. 5 is a side view of the test device of FIG. 1 showing the cage, computer, amplifier, and other components.
Figure 6:
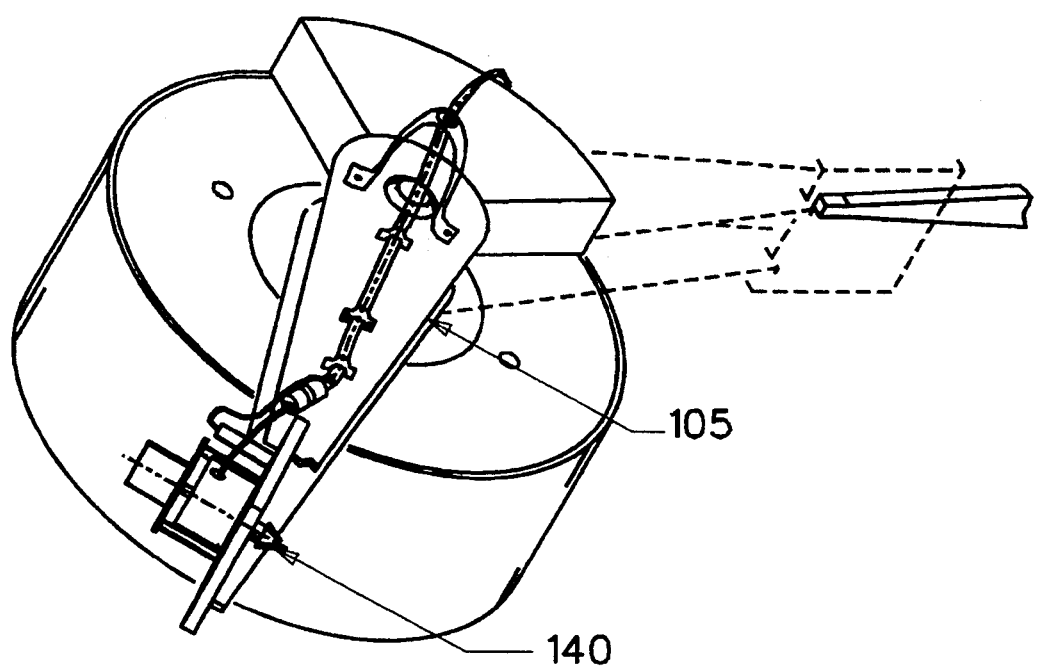
FIG. 6 is a detailed perspective view of the swivel arm in the test device of FIG. 1 shown at the load position and showing an impactor button at the free end of the arm.

The sequence of operation of the test device is as follows: Arm 105 begins at a load position (as shown in FIG. 6) where a sensor is mounted onto the sensor mounting plate. A protective cover 201 as shown in FIG. 5, is then closed and locked. The computer then checks that the arm 105 is at the load position and that a sensor has been mounted. A command is sent to the servo motor controller, located on board 202, to accelerate the arm to a precise velocity. This velocity is accurately maintained through a feedback loop from an encoder 203 which, with appropriate circuitry, gives an accurate indication of the position of the arm from which its velocity can be found. This velocity is maintained as the armswings toward one of the pulse generating springs 119a, b, or c. Also through the encoder, the computer knows precisely the location of the arm 105 relative to the pulse generating spring 119. At the point that impact is about to occur between mounting plate 109 and spring 119b, a command is sent to the servo motor to set and maintain a current of zero amperes in the motor armature, thus the motor will no longer exert a torque on the arm 105. As mounting plate 109 impacts spring 119b, it deflects the spring while the spring exerts a force onto the mounting plate. This causes the arm 105 to decelerate, stop and rebound off spring 119b. Springs 119b are designed so that very little energy is dissipated during this process with the result that after impact, the arm 105 is rotating in the opposite direction at very nearly the same angular velocity as it had prior to impact. When the armature has rotated so that mounting plate 109 is no longer contacting spring 119*b*, a command is sent to the servo motor to maintain the rebound velocity. This continues until the arm 105 has returned close to its initial load position at which point the servo motor is commanded to stop rotation.

It can be shown mathematically that an ideal linear spring will create a perfect half sine acceleration pulse regardless of the velocity of impact. As described above, a typical test series consists of three pairs of pulses typically with durations of 10, 20 and 30 milliseconds. Each pair of pulses consists of one low velocity pulse where the sensor is required not to trigger and one high velocity pulse where the sensor is required to trigger before a maximum velocity change has taken place.

A single spring can create both pulses for the given duration. FIG. 5 illustrates the use of three springs 119; one designed for a short pulse (119*a*), one for an intermediate pulse (119*b*) and one for a longer pulse (119*c*). Once the spring has been constructed, it will only provide a single duration pulse for an impactor having a particular mass, thus three springs are needed to perform the six required pulses. Obviously, a larger or smaller number of springs could be used.

In order to achieve a near ideal half sine pulse, the spring must be properly designed. Most springs have many modes of vibration which are excited when they are impacted. Some of these vibration modes will interact with the impactor causing the pulse to the impactor to deviate from an ideal half sine pulse. This is usually evidenced by a superposition of higher frequency vibrations. For example, if an ordinary steel beam is used as a spring, as the two shown in FIG. 11, the natural frequency of this spring will be superimposed on the desired half sine pulse. Three spring designs have been shown to function successfully with the test device of this invention. These are illustrated in detail in FIGS. 7, 9 and 10.

Figure 7:
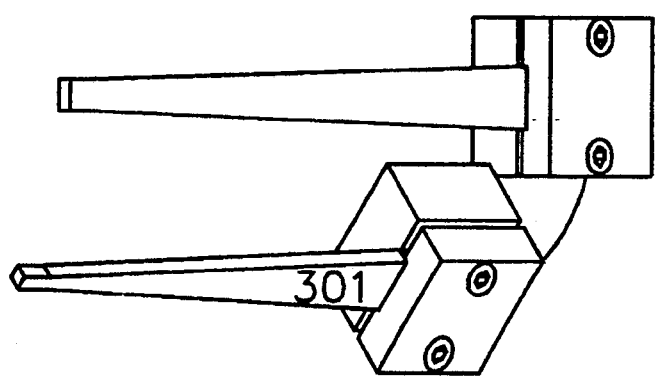
FIG. 7 is a perspective view showing two examples of a cantilevered, high strength steel spring design used in the test device of FIG. 1.
Figure 7A:
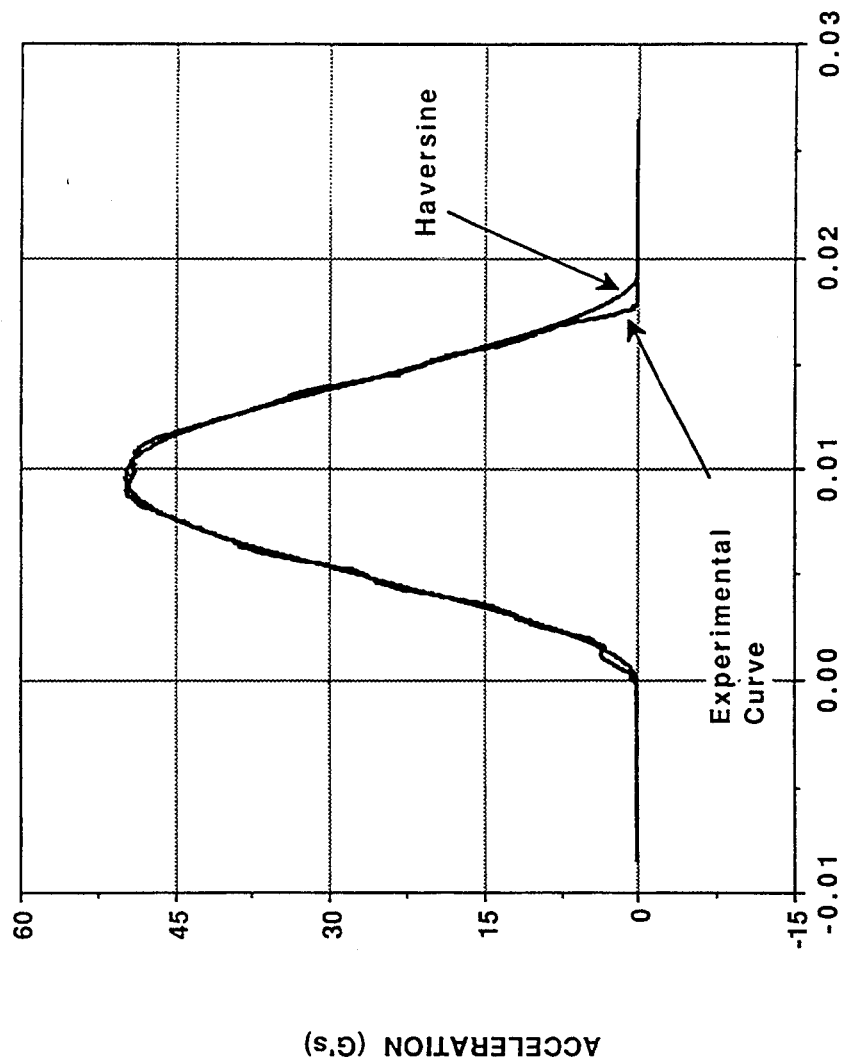
FIG. 7A is a graph showing the acceleration pulse produced by the spring of FIG. 7, compared to a haversine pulse.

FIG. 7 is a detailed drawing showing two examples of a tapered spring 301 made from hardened, high strength tool steel, and FIG. 7A is a plot of a pulse obtained from this spring. Careful attention must be paid to the design of springs of this type and the interface between the spring and the impactor. For most designs, one or more of the natural frequencies of the spring itself will become superimposed on the striker pulse. This effect can be minimized by designing the spring with the minimum mass and maximum strength. The mass of the spring of FIG. 7 was reduced by the tapered design which was chosen so that each cross section along the length of the spring carries the maximum stress which is due to bending and appears in the outermost fibers of the material. High strength steel was chosen again to minimize the mass of the spring and thus to create a spring having the highest natural frequency.

Figure 6A:
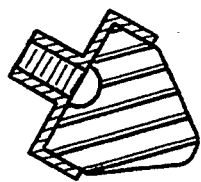
FIG. 6A is a detailed cross sectional view of the impactor button shown in FIG. 6.

The impactor contains a rubber button member 140 shown in FIGS. 6 and 6A. This button was designed so that it damps out the high natural frequencies from the spring without effecting the lower natural frequency of the spring impactor mass combination. A combination which functioned well consists of a spring made from Starrett alloy 496 (a nondeforming chromium/tungsten/vanadium steel alloy) which has been oil hardened at 1760 degrees F. and then tempered at 400 degrees F. for two hours. This spring is 0.1875 inch thick and 0.75 inch wide at the support tapering to 0.25 inch at the free end. The length of the spring is 7 inches, and when impacted with an effective mass of three pounds, the combination gave a half sign pulse width of about 0.023 seconds as shown in FIG. 7A. Obviously, other spring designs are possible including a spring which is simply supported at both ends or one with both ends built in. Care must be taken to assure that the spring natural frequencies are sufficiently high that they can be damped out by the rubber button. In one example the button was made from neoprene and was 0.5 inch in diameter by 0.5 inch long with a conical shape as shown in FIG. 6A.

Other cross section geometries are also possible for the spring of FIG. 7 such as an I-beam shape which concentrates more of the material where the stresses are maximum. Such a design for some applications will give better performance, particularly where even longer pulses are required.

Figure 8:
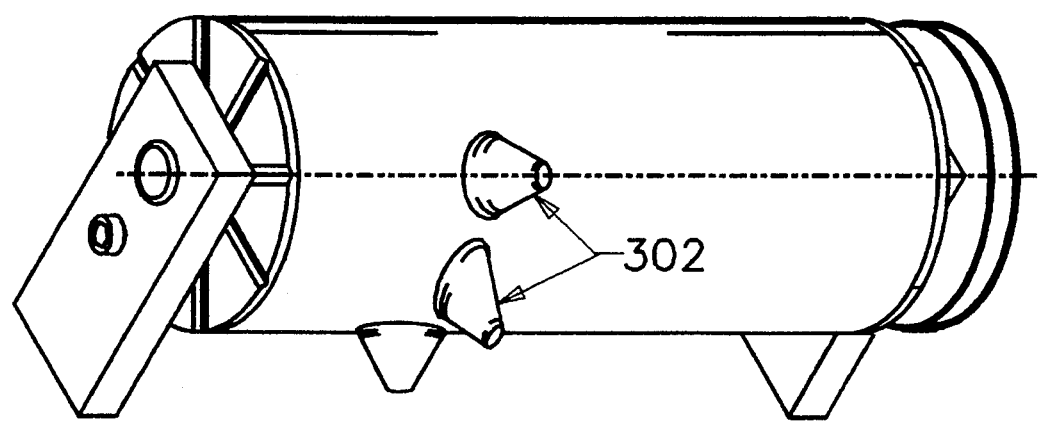
FIG. 8 is a perspective view showing three examples of a rubber spring design used in the test device of FIG. 1.
Figure 8A:
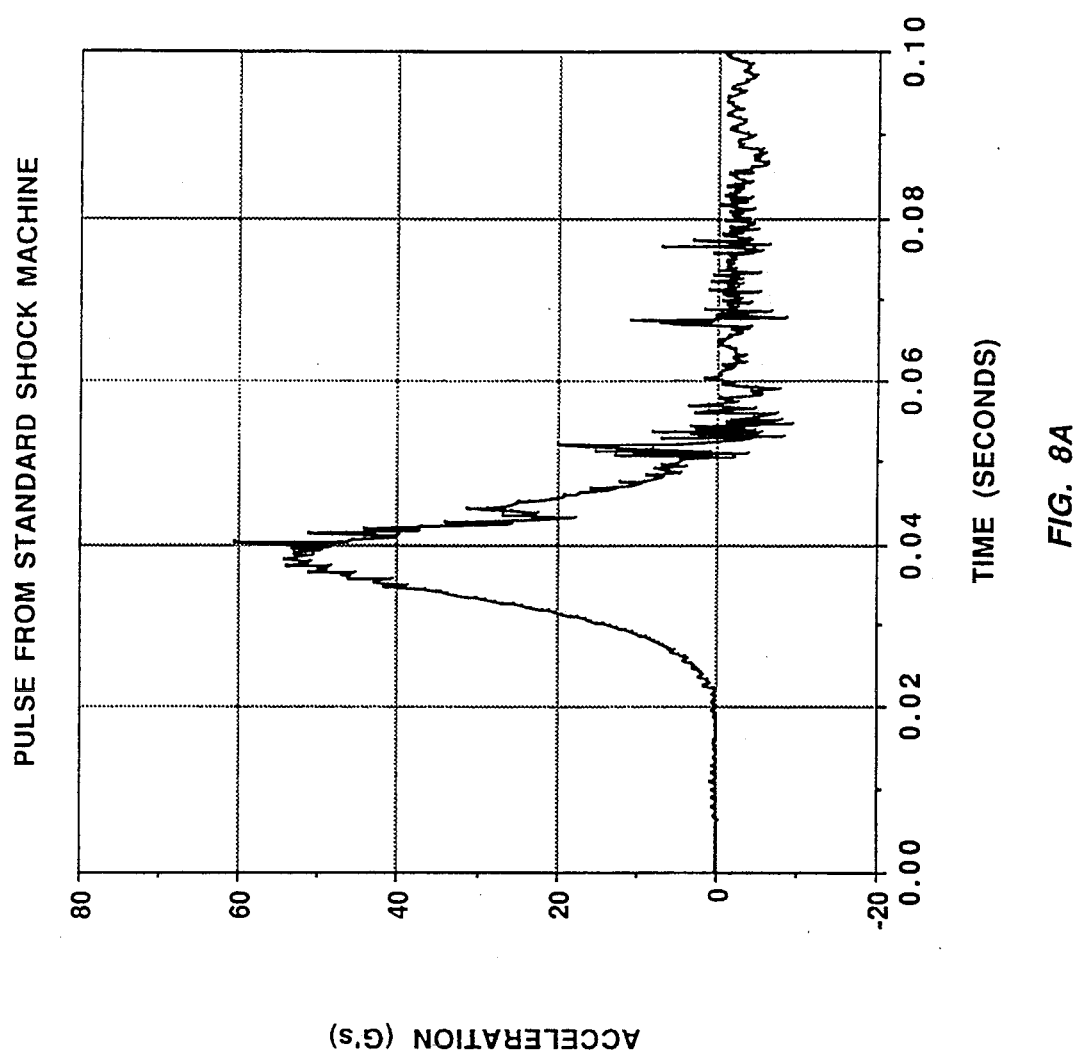
FIG. 8A is a graph showing the acceleration pulse from a standard shock machine which uses a rubber spring.
Figure 8B:
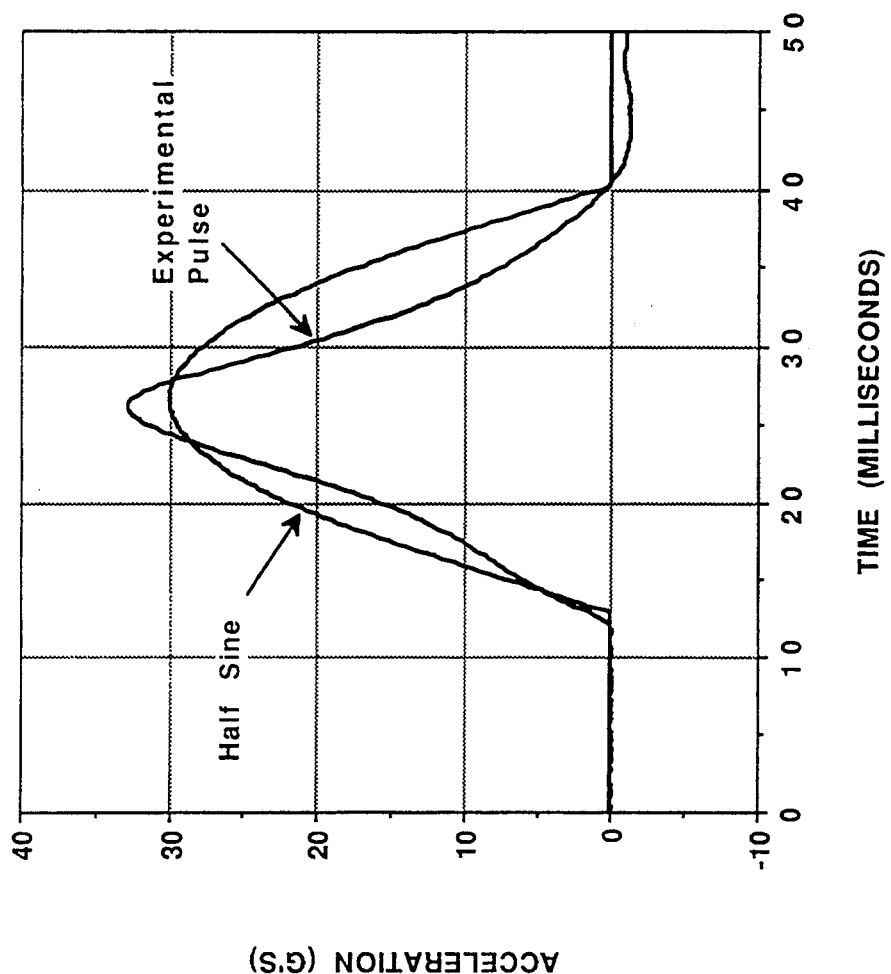
FIG. 8B is a graph showing the acceleration pulse from a pendulum impactor which uses a rubber spring.

FIG. 8 is a detailed drawing of a conical spring 302 made from rubber. Springs of this type are conventionally used in shock testing machines and are characterized by the presence of unwanted high frequency vibrations as shown in FIG. 8A and 8B. FIG. 8A is from a rubber impactor from a vertical shock testing machine such as manufactured by AVEX Corporation. FIG. 8B is from a small pendulum tester using a rubber impactor. FIG. 8A is characterized by the presence of high frequency vibrations while FIG. 8B shows lower frequency components. A half sine pulse has been superimposed on the actual curve of FIG. 8B to show the pulse deviation from the ideal.

Figure 9:
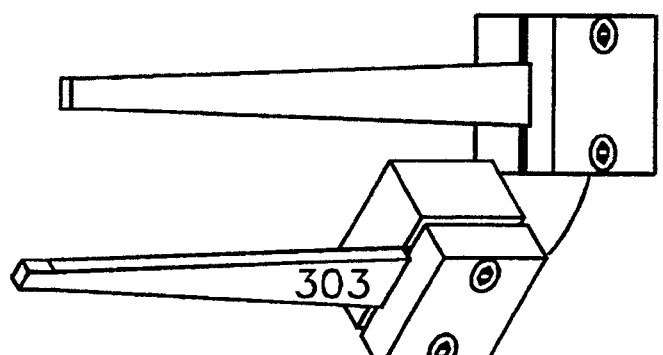
FIG. 9 is a perspective view showing two examples of an alternative spring design using graphite fiber reinforced plastic.

FIG. 9 shows another preferred embodiment of a spring 303 made from graphite reinforced plastic. Through the use of this design, the mass to stiffness ratio of the spring is further increased over springs made from high strength steel. Thus, the natural frequencies of the spring are further increased resulting in a clean pulse.

Figure 10:
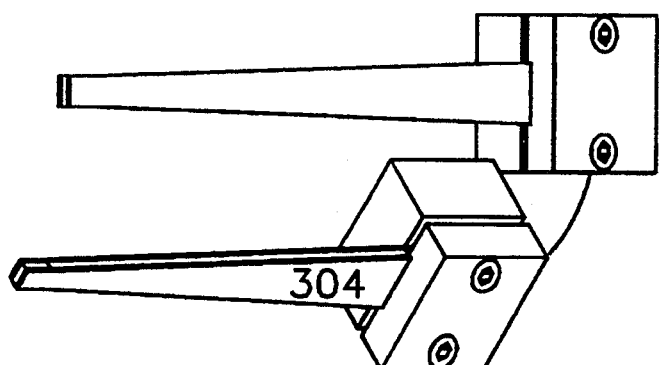
FIG. 10 is a perspective view showing two examples of another alternative spring design using a fiber glass reinforced plastic composite (laminate).
Figure 10A:
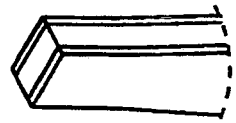
FIG. 10A is a detailed perspective view of the free end of the spring of FIG. 10.

FIGS. 10 and 10A show still another alternate preferred spring design 304 made from a compound design of fiberglass. This rectangular spring design consists of a center core made from randomly dispersed glass fibers in a plastic matrix. Bonded to both sides of the center core are oriented glass fibers held in a plastic matrix. This combined design is more easily made than the graphite design in FIG. 9, and therefore may be preferred for some low volume applications.

Figure 10B:
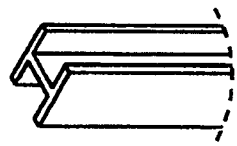
FIG. 10B is a detailed perspective view of the free end of an I-beam spring design.

FIG. 10B shows a similar spring design having an I-beam shape in cross section.

Figure 11:
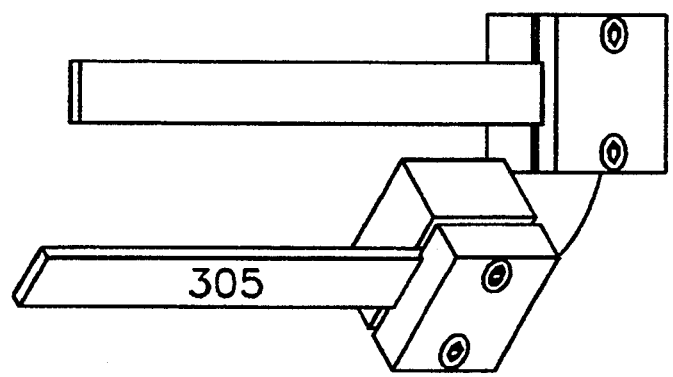
FIG. 11 is a perspective view of another alternative spring design using a standard steel beam.
Figure 11A:
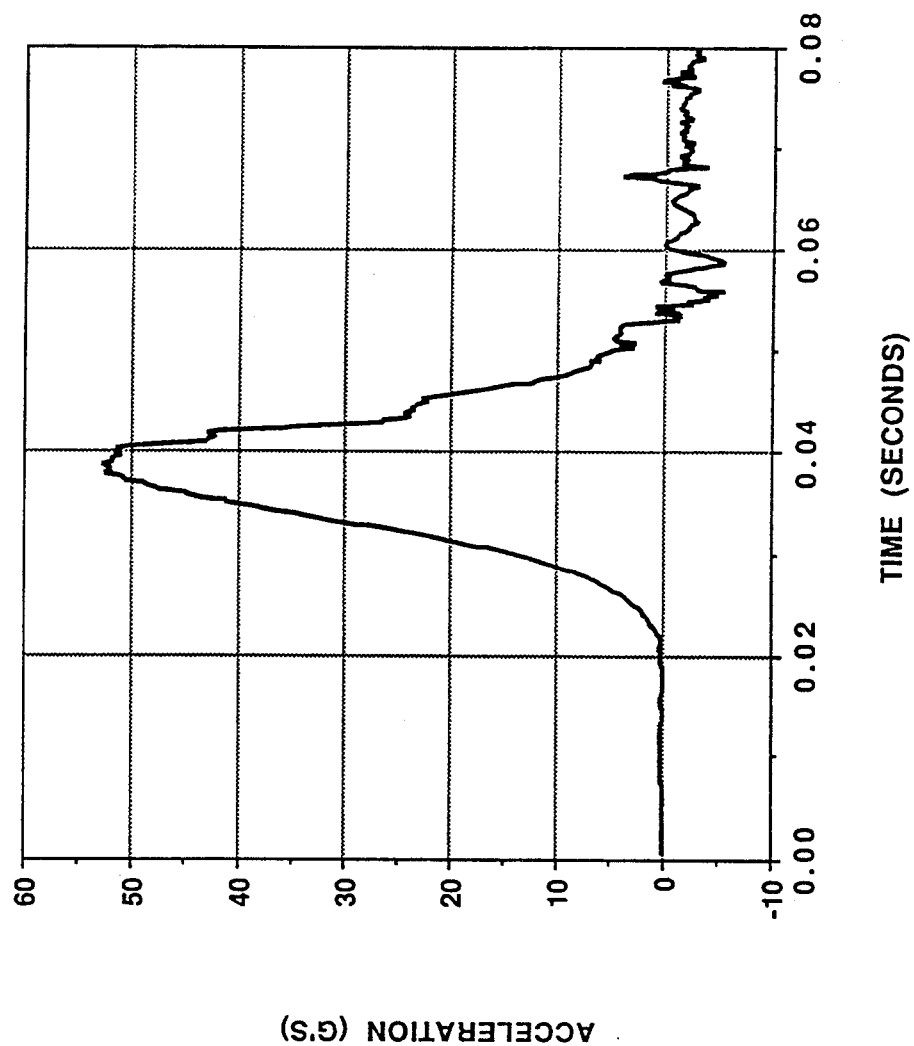
FIG. 11A is a graph showing the acceleration pulse produced by the spring of FIG. 11.

FIG. 11 illustrates a flat, non-tapered spring 305 made from conventional steel and FIG. 11A depicts the resulting pulse showing the superposition of the high frequency vibrations.

Provided that proper attention is paid to the design of this test device, and the pulse generating springs, to achieve a nearly ideal half sine pulse, there is no need for complicated computer programs to shape the pulse. In fact, since the pulse comes from the basic physics of the interaction, it cannot be modified. This eliminates most of the disadvantages of the test devices of earlier design.

The velocity change of the pulse is also much more accurately controlled in this test device than in previous test devices. The basic measurement device for determining the pulse is an encoder which is a very high resolution device that indicates precisely the angular location of the servo motor shaft at any time. From this it is possible to accurately determine the angular velocity of the arm and thus the impact velocity of the impactor against the spring. Since the springs have been designed to be highly elastic, there is negligible energy loss during the impact and thus the velocity change of the test is accurately known. As mentioned above, accelerometers typically have an accuracy of ±1%, and thus the velocity change of the armature in a standard test device is only known within that same accuracy. In contrast, using the encoder on the present test device, plus appropriate computer software, it is possible to determine the velocity change of impact to within ±0.2%.

The sources of random noise which plague the standard test devices are either absent or have significantly less effect in the test device of the present design. The bearings, for example, are located on the servo motor shaft and do not roll great distances over an unknown track. The bearings are sealed and thus contamination cannot penetrate and become a source of noise. Since the bearings are at a small radius, their effect on the end of the arm is negligible.

The effective weight which must be accelerated in one preferred embodiment of the test device of the present invention is approximately 1.3 pounds exclusive of the sensor. In contrast, a standard linear test device having similar load capacity must accelerate a weight of about twelve pounds. The acceleration of the arm in the rotary test device takes place prior to impact and thus the output from the switching amplifier is at a minimum at the time that the accelerometers are recording data. Furthermore, the servo motor is carefully shielded and does not have a radiating voice coil as in the case of the linear test device. The acceleration of the rotary test device also can be done more gradually since the acceleration pulse can be longer and its shape is not important since it is used only to bring the arm to a given velocity. For these reasons, the maximum power required by the rotary test device is less than 10% of that required by the linear test device. Thus, the level of potential radiation is substantially reduced. For all of these reasons, the signal read by an accelerometer is virtually devoid of electrical noise for the rotary test device.

The source of the test pulse, i.e. the spring 119 and button 140, interacts directly with the sensor mounting plate 109. The transmission lag characteristic of linear actuators is, thus, absent in the rotary test device. Also, by placing the center of percussion of the arm, relative to the shaft of the servo motor, at the sensor minimizes the chance of exciting natural frequencies in the arm during the pulse generation process resulting, once again, in a very clean half sine pulse.

Figure 4:
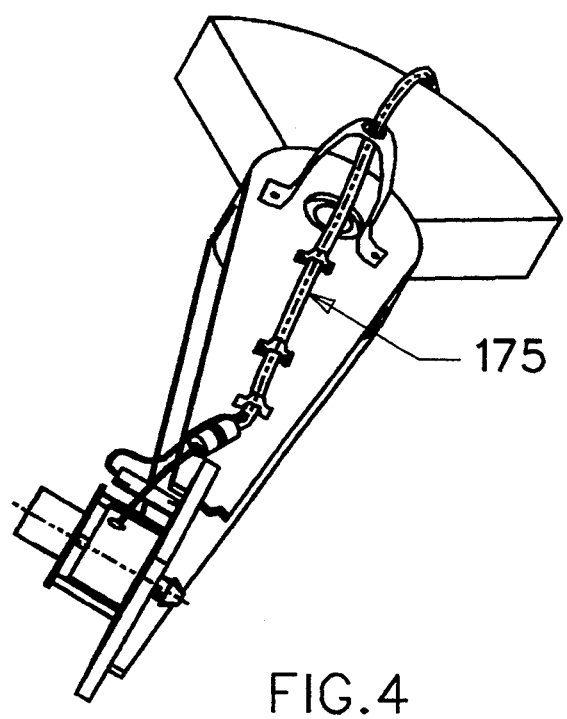
FIG. 4 is a detailed prespective view of the sensor, sensor mounting plate, accelerometers, and wire routing in the test device of FIG. 1.

The wires 175 from the accelerometer and from the sensor are carefully routed along the arm 105 of the test device, as shown in FIG. 4, until at a small radius they leave the arm and are connected to the computer. This routing of the wires permits careful shielding throughout the entire path from the accelerometers to the computer, thus eliminating noise from stray electromagnetic fields.

The velocity change of the half sine pulses can be simply adjusted by the computer program with a single command to the servo motor control board. Since the pulses do not have to be corrected, this device permits the iterative determination of the marginal trigger velocity change for a given pulse duration for a given sensor. Using as many as eight springs, the entire marginal response curve of a sensor can be rapidly estimated with this rotary test device. The process can be carried one step further since once several points on the response curve are known, many of the physical parameters of the sensor are determined. For this case a computer mathematical simulation model of the sensor being tested would be part of the device. A program would direct the test device to subject the candidate sensor to a series of tests and the computer would calculate the most likely value of several key sensor parameters. Using this process as part of the quality assurance program during sensor manufacture, many key parameters of the sensor can be studied through control charts and monitored. For the ball-in-tube sensors, these parameters include the clearance between the ball and tube, the length of travel, the bias, the contact stiffness and the amount of air trapped initially behind the sensing mass.

Sensors are currently tested to specifications. These specifications must take into account the variability of the test device as well as the variability expected during manufacture of the sensor. This variability, as discussed above, will be considerably less for the rotary test device of this invention than for conventional linear test devices. Through the use of the mathematical simulation model described above, the remaining variability of the testing device can be entirely eliminated. The output from the accelerometers mounted on the sensor mounting pad and from the shaft encoder can be fed directly into a computer mathematical sensor model, and a prediction made as to when a sensor manufactured to minimum and maximum tolerance extremes would trigger on a given pulse. If the pulse varied slightly, the computer predictions would also vary slightly, thus eliminating the variability of the test device from the determination of whether a sensor was manufactured within tolerances. The computer model predictions for the maximum and minimum tolerance cases would be compared to the actual sensor performance in determining whether the sensor had passed the test.

The accuracy of the ball-in-tube sensor is significantly affected by the roundness of the cylinder. The manufacturing process used for the cylinder imparts an elliptical character to the cylinder. If the ball travels down against the side along the minor axis at one time and along the major axis at another time, the velocity change required to trigger the sensor can vary greatly if the cylinder is not round. For a cylinder having a diameter of 0.375 inches and a difference between the major and minor diameters of 0.0001 inch, for example, the marginal velocity change required to trigger the sensor can vary from 9 MPH to 10.25 MPH for a sensor with a nominal clearance of 0.0015 inch. This condition can be automatically checked on the rotary test device taking advantage of the centrifugal acceleration. If the sensor is tested four times with a particular known angular rotation between each test, the effective out of roundness can be estimated and the sensor can then be rejected if the out of roundness exceeds an allowable limit. This automatic rotation can be achieved by using a rotary stepping motor (not shown) in conjunction with mounting plate 109 which would now be attached to arm 105 through a bearing which would permit the rotation of mounting plate 109 about a horizontal axis.

During an automobile crash, in addition to accelerations which are in the longitudinal direction, that is, in the front to back direction of the car and along the sensitive axis of the sensor, there are also frequently substantial accelerations in both the vertical and lateral directions. These acceleration components can effect the operation of a crash sensor. In some cases, for example, a sensor which would normally trigger in time on a crash will either trigger late or not at all if substantial vertical or lateral (cross-axis) vibrations are present. This degradation in sensor performance has been demonstrated on many staged car crash tests, however, it has been very difficult to establish a reliable test method to demonstrate this effect in the laboratory. Some attempts have been made to induce cross-axis vibrations in sensors through impacting the sensor mounting system with a hammer just prior to the longitudinal shock pulse. This method yields a transient pulse having several frequency components. It is dependent on the precise time of the hammer hit and on the damping characteristics of the mounting structure. No attempt has been made to control the magnitude, frequency and duration of these vibrations. Some cross axis vibrations naturally appear in sensor testers of both the test device and pendulum types. Once again, no attempt has been made to control the magnitude, frequency or duration of these vibrations. In fact, every attempt is made to eliminate them wherever possible. The rotary test device of the present invention, for the first time, permits the simultaneous controlled vibration of the sensor about a cross-axis while subjecting the sensor to a simulated idealized crash pulse. This is accomplished by exciting the natural frequency of the arm in the vertical direction while the impact is occurring. By controlling the excitation source, the magnitude and duration of the vibrations can be controlled.

Figure 12:
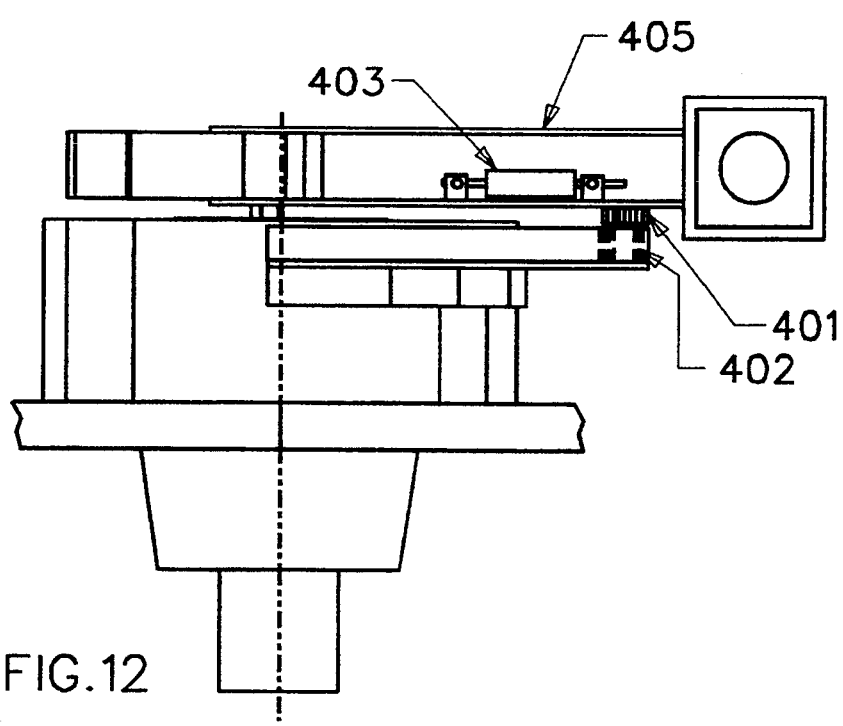
FIGS. 12 and FIG. 12A are side and end views, respectively, of a magnetic cross-axis excitation system arranged on the swivel arm of the rotary test device of FIG. 1.
Figure 12A:
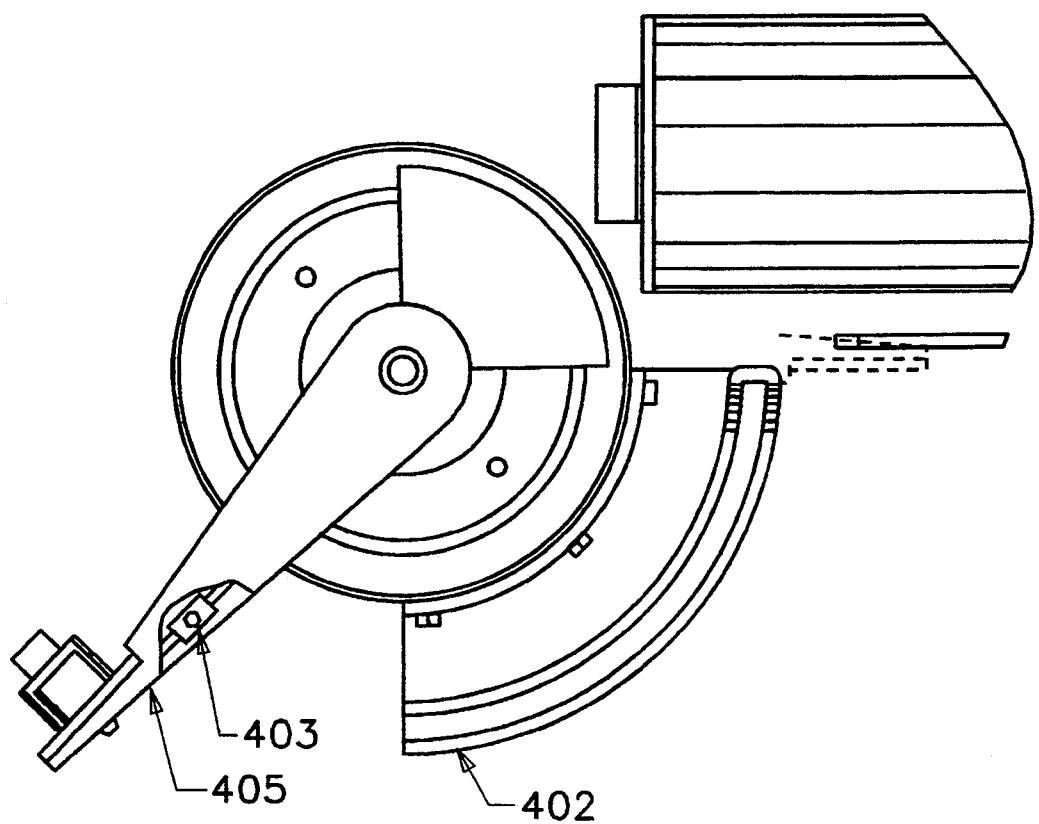

FIGS. 12 and 12A illustrate the addition of a cross-axis vibration capability to the test device. A portion of the test device arm 405 has been constructed from laminated iron 401 and a U-shaped electromagnet 402 has been positioned so as to exert a magnetic force on the laminated iron. An alternating electrical current is made to flow in the windings of the electromagnet, which creates an alternating magnetic force on the laminated iron. If the current frequency is at half the natural frequency of the arm, the arm can be caused to vibrate in the vertical plane (transverse to the direction of rotation) creating the desired cross-axis vibration.

An adjustable weight 403 is provided on the arm to permit the tuning of the natural frequency of the arm and thus permit some variation in the cross-axis frequency. Similarly, arms can be constructed of different materials and geometries in order to substantially vary the natural frequency in the vertical direction. Through a combination of the electromagnet, adjustable weights and different armature constructions, a range of cross-axis vibrations from 100 to 2,000 Hertz can be achieved. This creates, for the first time, a test device which is capable of simultaneously vibrating the sensor in a cross-axis direction while subjecting the sensor to a longitudinal pulse.

Figure 12B:
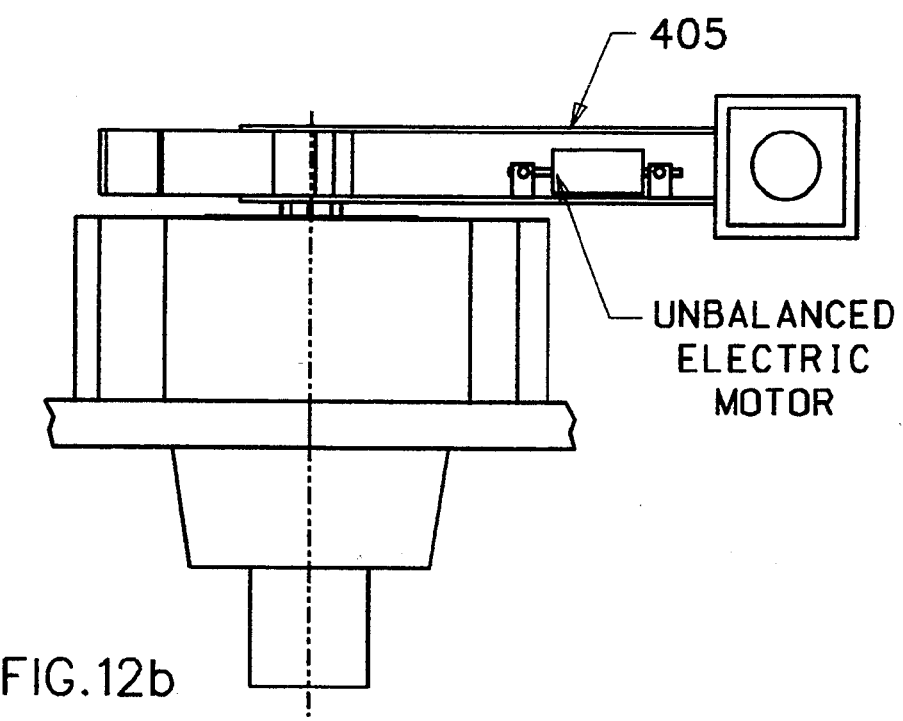
FIGS. 12B and 12C are side and end views, respectively, of an unbalanced motor cross-axis excitation system, similar to that of FIGS. 12 and 12A.
Figure 12C:
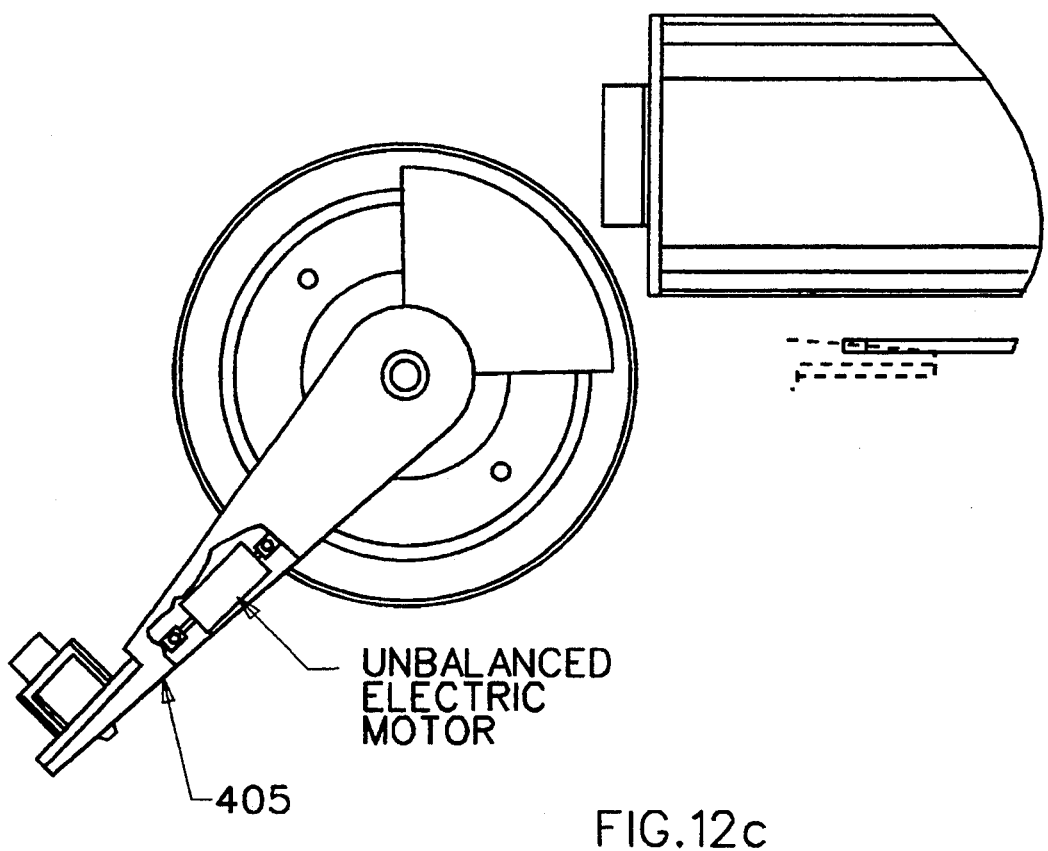

Other devices than the electromagnet described above can also be used to excite the natural frequencies of the arm. In particular, a small electric motor with an eccentric weight can be mounted on the armature as shown in FIGS. 12B and 12C, or a small voice coil can be arranged to extend from the armature into a permanent magnetic structure.

Figure 12D:
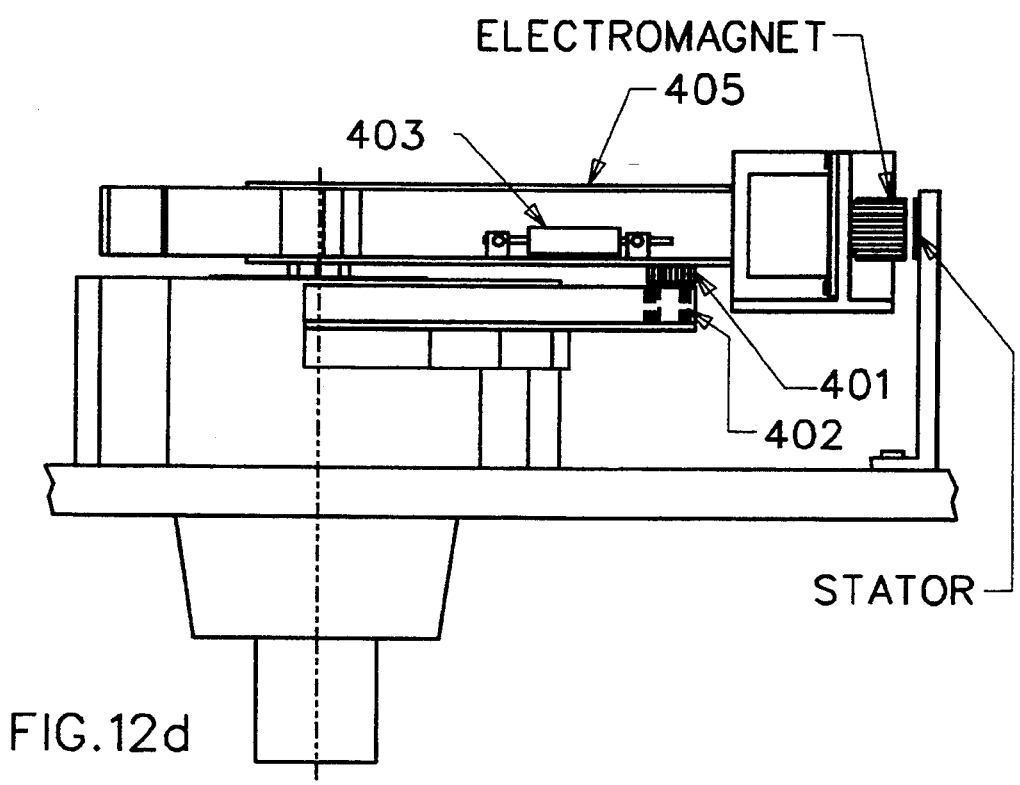
FIGS. 12D and 12E are side and end views, respectively, of a magnetic cross-axis excitation system designed to vibrate in two orthogonal directions.
Figure 12E:
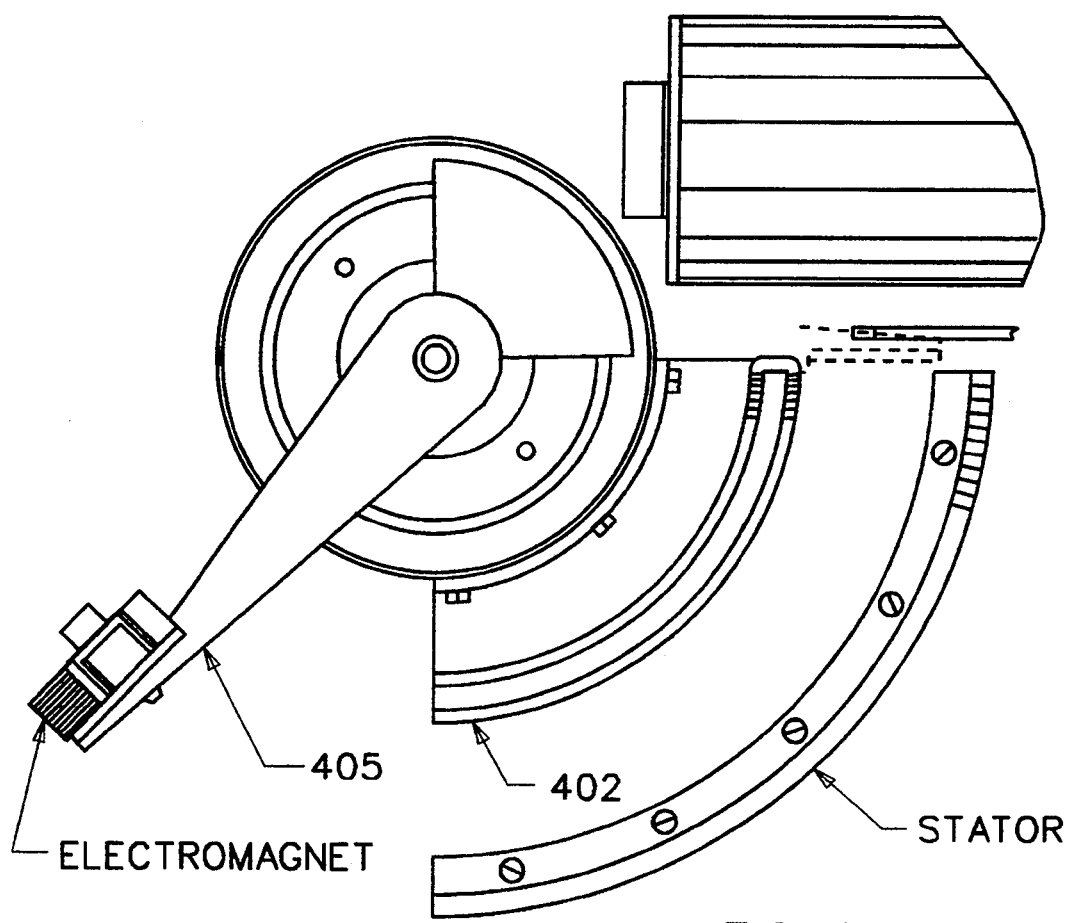

It is usually only necessary to excite a single cross-axis vibration in order to test a sensor for sensitivity to cross-axis accelerations. Nevertheless, a similar technique can be used to also excite a second cross-axis vibration along the axis of the arm for limited range of frequencies. This can be accomplished by a somewhat flexible coupling between the arm and the sensor mounting plate, and through exciting the sensor mounting plate relative to the arm. If the sensor is mounted on a vertical cantilevered beam, as shown in FIGS. 12D and 12E, a second U-shaped magnet can be used to excite the beam in a similar manner as shown in FIGS. 12 and 12A. Thus, cross-axis vibrations in two orthogonal axes at different frequencies can be achieved.

Other methods of inducing cross-axis vibrations will now suggest themselves to those skilled in the art and some methods might even be applicable to conventional test devices.

The rotary test device described in detail herein is but one example of the use of this invention for creating controlled shock pulses. If the shock pulse is of sufficiently low velocity, the servo motor can create the entire pulse thus eliminating the need for the springs. This would be the case, for example, in testing safing or arming sensors which trigger on a very low velocity change.

In addition to testing crash sensors, there is also a general need for such equipment for testing military fuzes as well as all types of electronic equipment which must be designed to withstand certain levels of shock and vibration. What has been described here, therefore, is a very general, precise shock testing machine with various options such as the addition of cross-axis vibrations.

Figure 13:
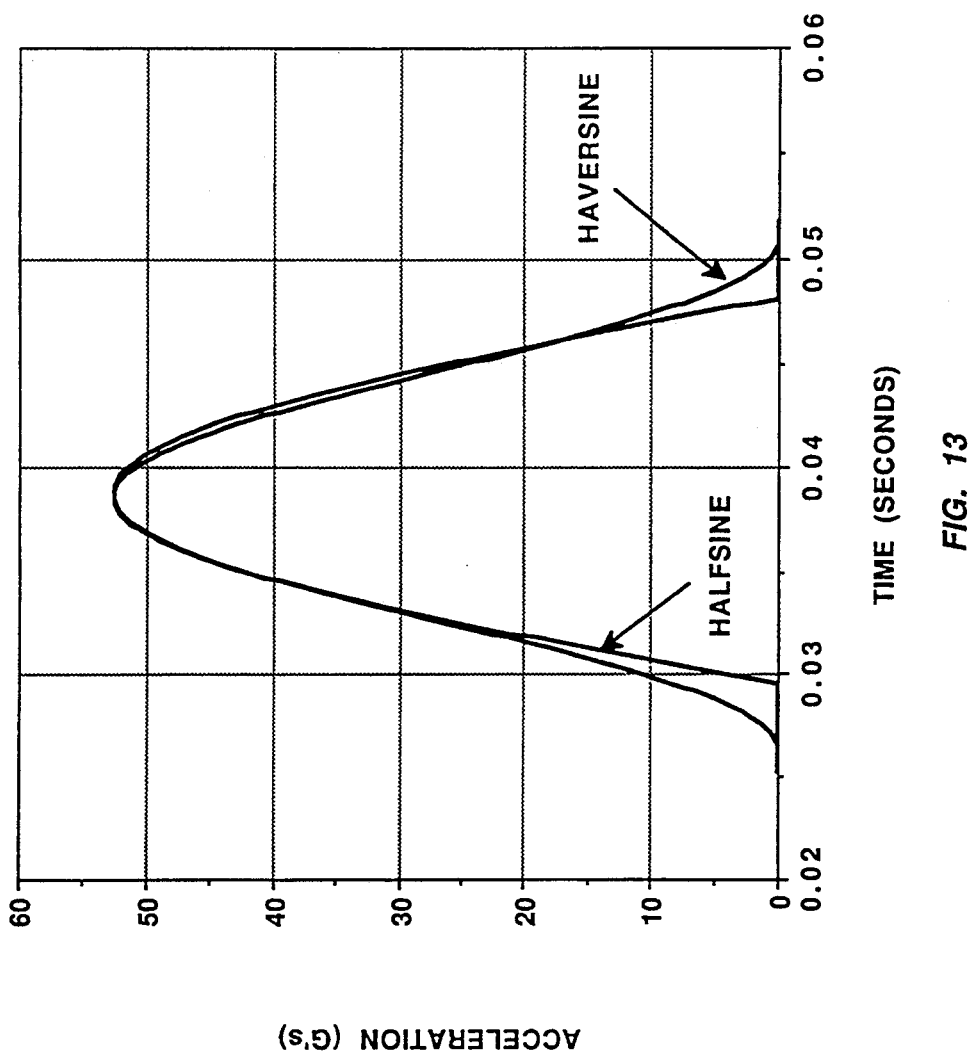
FIG. 13 is a graph of a comparison of a haversine wave form and a half sine wave form.
Figure 14:
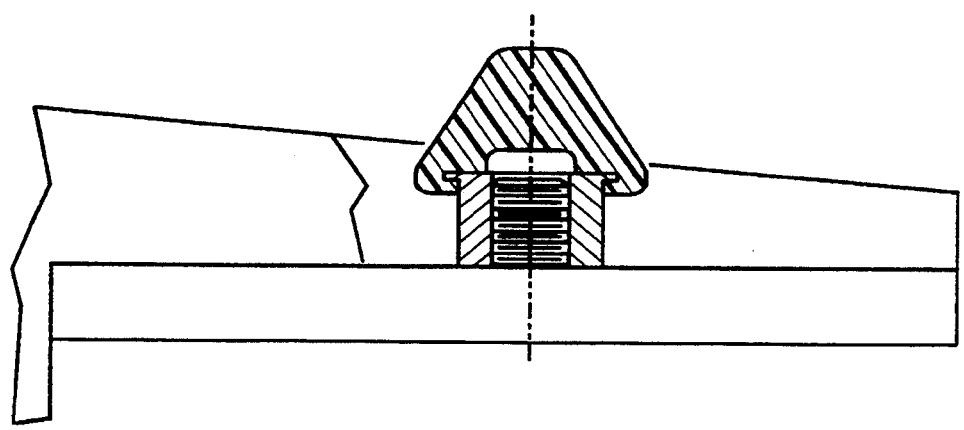
FIG. 14 is a detailed side view, partly in section, of a soft rubber pad arranged on an impactor in order to achieve an approximate haversine pulse.

For the purposes of testing crash sensors, apparatus for producing an accurate half sine pulse was described above. Some automobile manufacturers require sensors to be tested to a haversine pulse shape. FIG. 13 shows a comparison of a half sine pulse and an approximately equivalent haversine pulse. Using a standard measure of goodness of fit, the root mean square (RMS) deviation between the half sine generated by the rotary test device and an ideal haversine pulse is quite low. For an unfiltered pulse, for example, it is substantially lower than the RMS deviation of a pulse created by a standard linear test device, from an ideal haversine pulse. Thus, even though this rotary test device is designed to produce half sine pulses instead of haversine pulses, it still produces a better haversine than a standard test device. Nevertheless, if it is desired to achieve a pulse which is even closer to a haversine shape, it has been found that if a piece of rubber is used as a pulse converter and if it is inserted between the impactor and spring, as shown in FIG. 14, a very close approximation to a haversine pulse results.

Figure 22A:
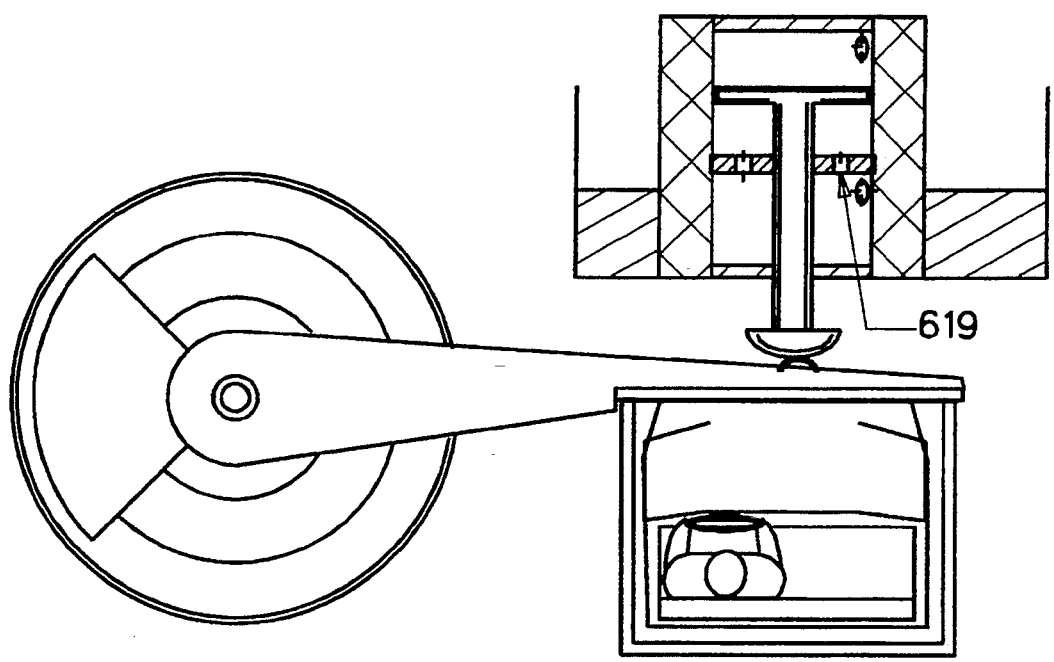
FIG. 22A is a plan view of a rotary sled, according to this invention, used in conjunction with a dashpot decelerator.
Figure 22B:
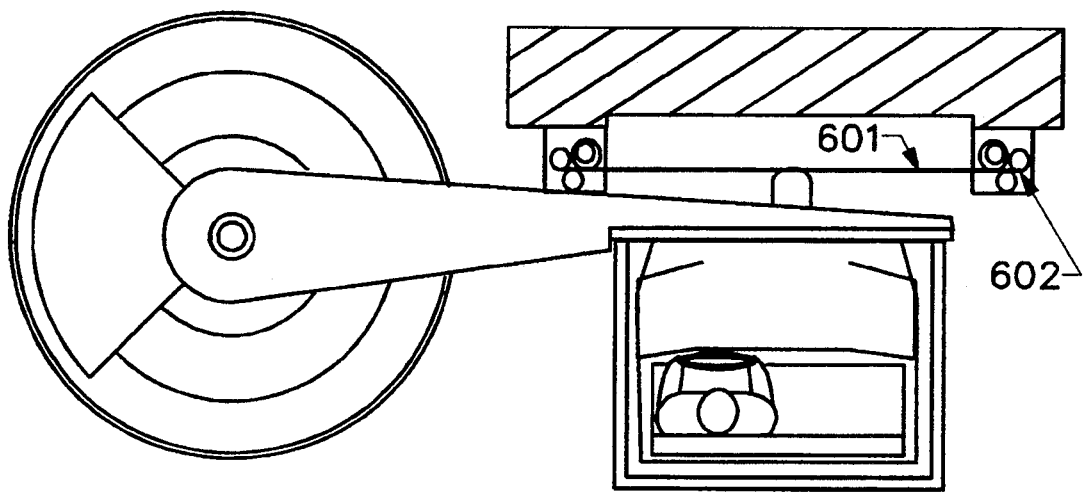
FIG. 22B is a plan view of a rotary sled, according to this invention, used in conjunction with a band and roller decelerator for simulating crash pulses.
Figure 22C:
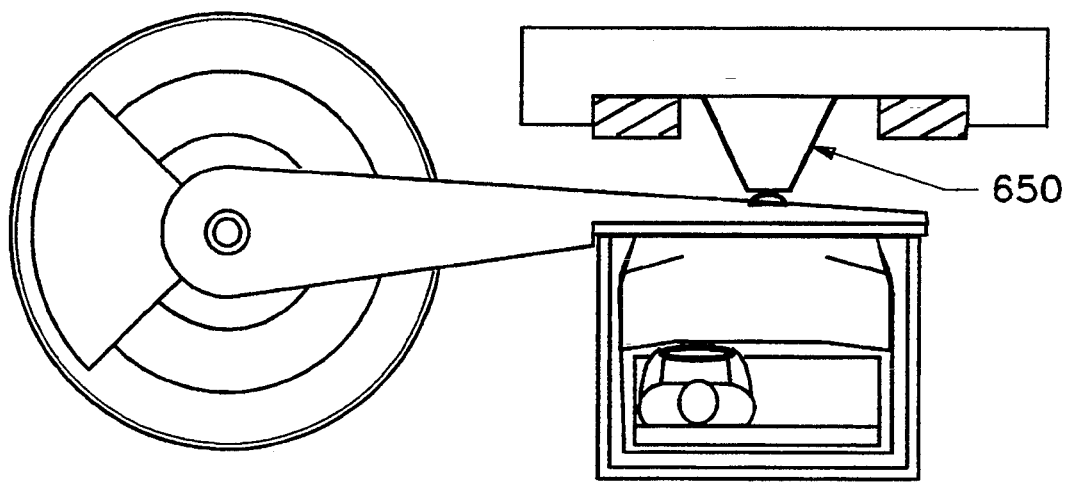
FIG. 22C is a plan view of a rotary sled, according to this invention, used in conjunction with an elastica spring decelerator for constant acceleration pulses.
Figure 22D:
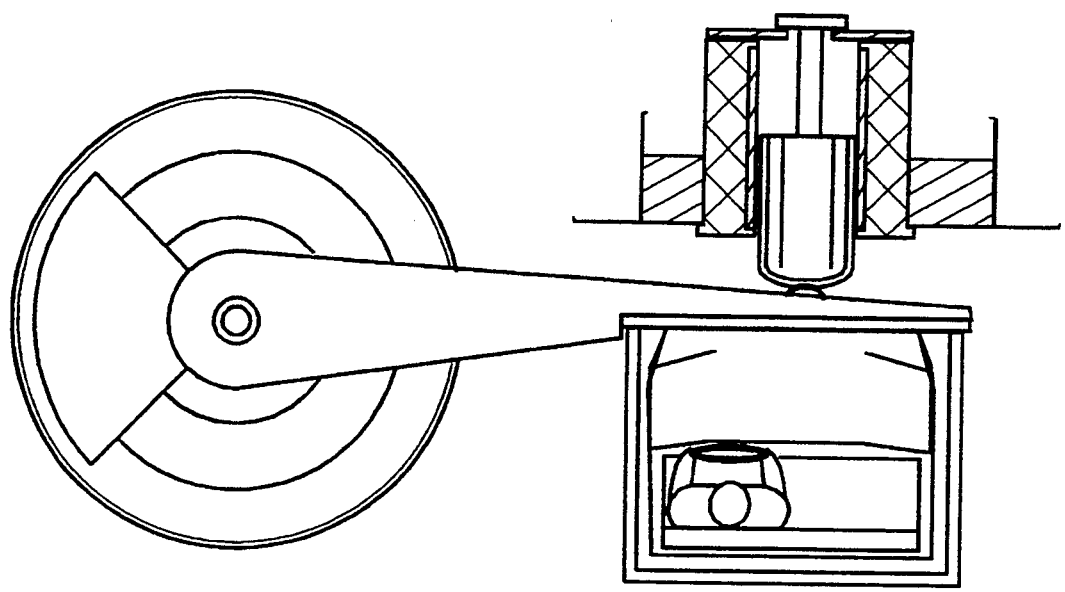
FIG. 22D is a plan view of a rotary sled, according to this invention, used in conjunction with an electromagnetic system for controlling the deceleration pulse.

Other mechanisms can be substituted for the springs 119 if it is desired to achieve pulses of different shapes. Viscous and inertial flow dashpots, shown generally as 619 in FIG. 22A for example, can be used to provide pulse shapes of the exponential and hyperbolic forms. Similarly, combinations of springs and dashpots and variations in the form of rubber springs, for example, can all be substituted for spring 119 to achieve practically any desired shock pulse shape. A known mechanism for more accurately simulating a crash pulse is to use a combination of metal bands and rollers, as shown in FIG. 22B. The bands 601 are fed through a series of rollers 602 such that the resistance to motion is a function of the roller pressure and the band width. By varying the band width, the resistance can be tailored versus time to closely approximate a real crash pulse. Still, other mechanisms can be used to tailor the pulse such as, for example, the use on an electromagnetically controlled impactor, as shown in FIG. 22D, in place of the band and roller system. Several methods will now be obvious to those skilled in the art. Finally, if a constant acceleration is desired, a leaf or elastica spring 650 can be used as shown in FIG. 22C and as taught in U.S. Pat. No. 2,770,126 to Brown.

A characteristic of using rotary versus linear motion is the presence of centripetal acceleration in the rotary system. If the length of the arm is 12 inches and the desired velocity change is 13 MPH, it can be shown that the magnitude of the centrifugal acceleration is about 3 g's. If the test device is operated in the vertical direction such that the impact takes place at the top of the arc, the acceleration due to gravity would reduce this to 2 g's. By tilting the mounting platform, the maximum effect during the impact can be reduced to ±1 g. All vehicle crashes have very substantial cross-axis accelerations and thus sensors must be designed so as to not be effected by these accelerations. The production testing on the ball-in-tube sensor, for example, is purposely run with the sensor mounted at a 6 degree angle which produces a cross-axis acceleration of about 10% of the longitudinal acceleration, or as much as 10 g's. The magnitude of the centrifugal effect in the present invention can be reduced, if desired, to any degree through increasing the length of the arm.

Figure 15:
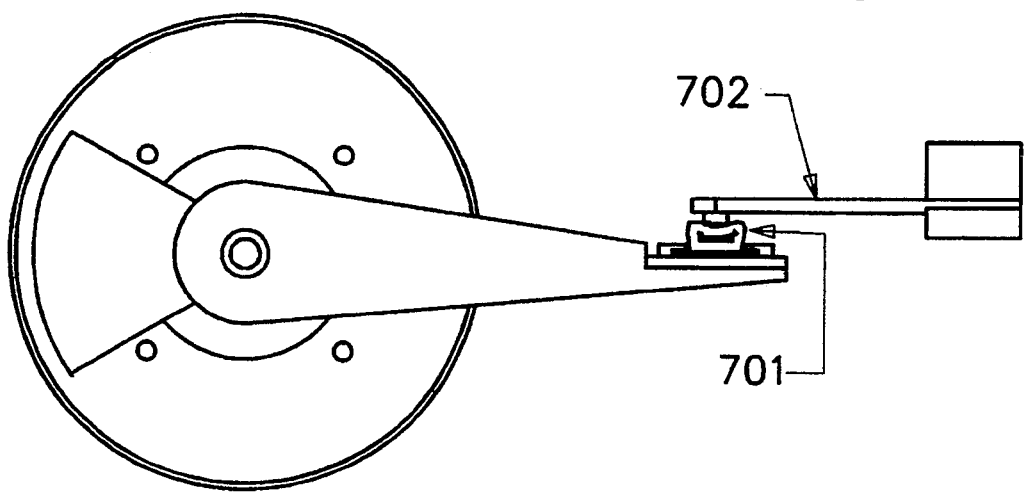
FIG. 15 is a side view of a crush sensor tester according this invention.

Most crash sensors used with air bags contain a seismic mass which is acted upon by accelerating the sensor. A new class of sensors, as described in the U.S. Pat. No. 4,995,639 to D. S. Breed, makes use of the physical displacement or crushing of the sensor. This patent describes a crush sensing switch, which when mounted at the proper place in the crush zone of the vehicle, measures when the crush zone has propagated to the sensor. In order to test a sensor of this type, therefore, the sensor itself must be impacted by a spring such as 119 in FIG. 1, or any of the devices which could be substituted for this spring as mentioned above. An important use of the rotary test device described herein, therefore, is for testing crush sensors as shown in FIG. 15. In this case, sensor 701 impacts directly against spring 702.

In addition to providing a controlled shock pulse, the rotary test device of the present invention is also capable of achieving a precise impact. Heretofore, impact testers have been either linear actuators similar to the linear test device described above, linear drop hammers or pendulums. Pendulums and drop hammers are normally actuated by gravity and therefore are severely limited in impact velocity. The linear actuators used for impact tests have normally been used to launch an impactor against a test specimen. The rotary test device of the present design maintains control of the impactor throughout the entire pulse, and can also achieve velocities much higher than readily achievable by pendulums or other gravity operated mechanisms. One particular use, for example, of this device is to determine the force versus deflection properties of a candidate padding material to be used, for example, on the interior of an automobile instrument panel or door. This can be done by either impacting the candidate material into a known form, or impacting the material with a known form.

Figure 16:
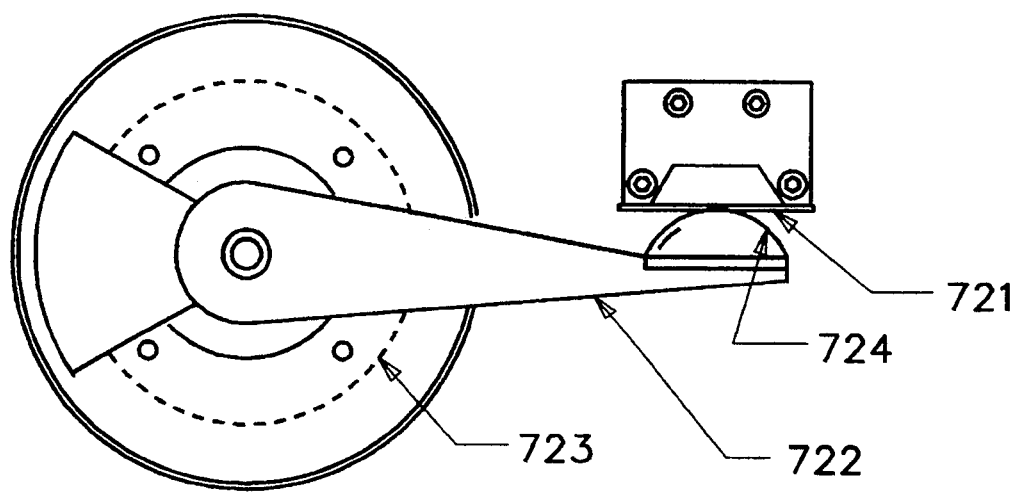
FIG. 16 is a side view of a test device, according to this invention, used to dynamically test materials under impact conditions.
Figure 17:
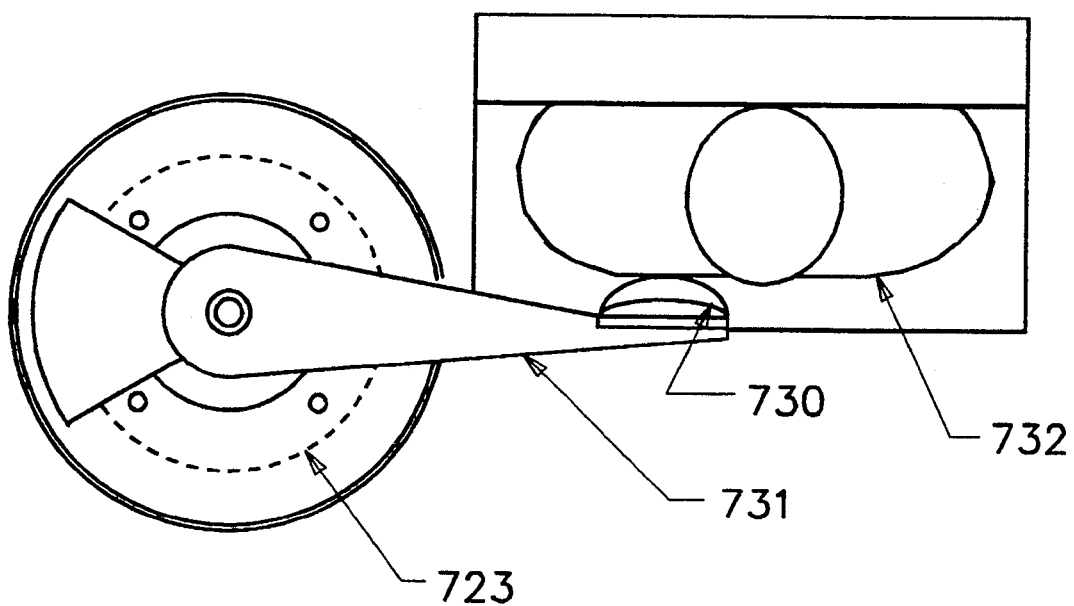
FIG. 17 is a side view of a test device, according to this invention, used to impact a material against an anthropomorphic dummy.

FIG. 16 illustrates the use of the rotary test device to determine the dynamic force deflection characteristic of a candidate padding material 721. Using the test device, a large number of tests can be run quickly at different impact velocities, using an appropriately shaped impactor 724, to fully characterize the material being studied. Using more conventional pendulum type devices, a drop height of 30 feet would be required to achieve a 30 mile per hour impact into a piece of candidate material. This test could be achieved with a rotary impactor having an arm 722 of 12 inches and a suitable servo motor 723 such as manufactured by PMI Motion Technologies of Commack, N.Y. Alternately, the padding material 730 could be mounted on the arm 731 of the rotary impactor as shown in FIG. 17. In this configuration, the material can be impacted into an anthropomorphic dummy 732 while measurements are being taken to determine the characteristics of the material.

Figure 18:
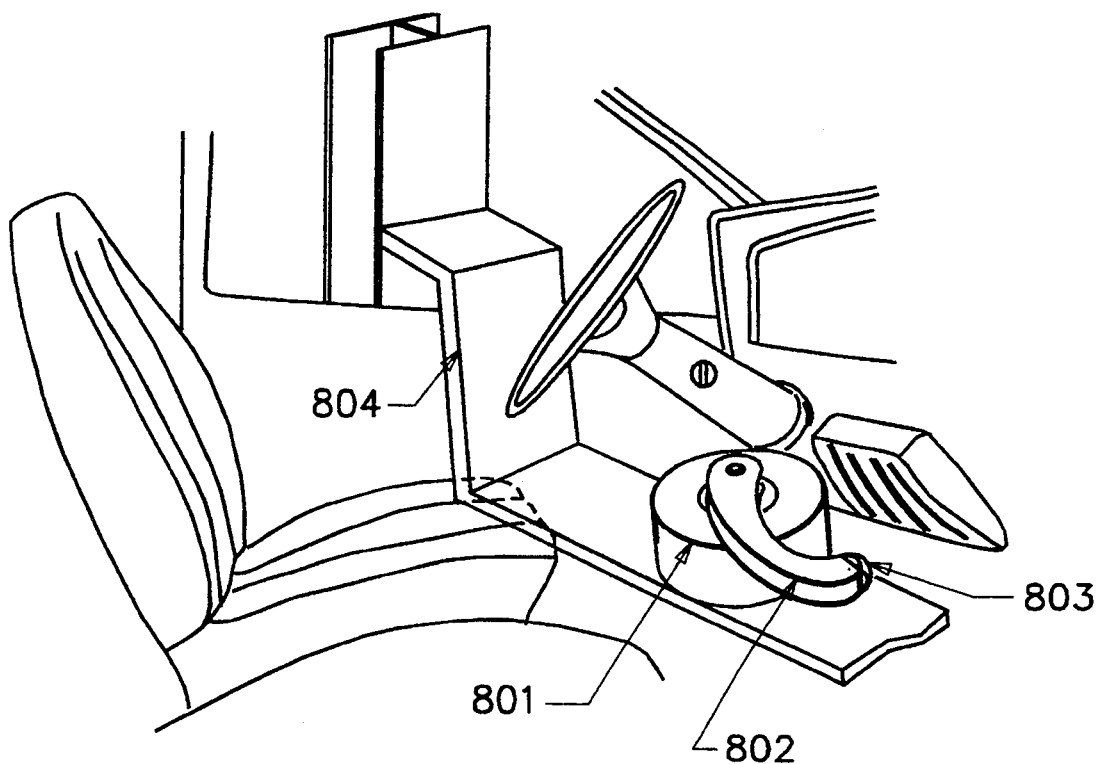
FIG. 18 is a perspective view of a portable rotary impact tester, according to this invention, used for in vehicle testing of the impact properties of a knee bolster.

Due to the fact that high velocities can be achieved in rather small spaces, the rotary impactor of this invention lends itself for in situ testing of the inside of an automobile passenger compartment, for example. Using this device, the dynamic response of padding in conjunction with the entire car structure can be accurately determined. Using a portable model of the rotary impactor containing servo motor 801, arm 802, impactor 803 and mounting structure 804, as shown in FIG. 18, the dynamic force deflection characteristics of a knee bolster can be accurately measured.

A very few applications have been illustrated for the use of a rotary impactor of this invention. Obviously, many other applications will suggest themselves to those interested in conducting such tests. In addition to the testing of vehicles, dummy, animal, human volunteer and cadaver testing can also be accomplished using the rotary impactor of this invention.

In order to determine the response of automobiles to various impacts, controlled hammer blows to portions of the vehicle are sometimes required. Abusive blows to a vehicle are also routinely conducted in order to determine the level of isolation that crash sensors have to such activities. This is used, for example, to estimate the immunity of a sensor system to hammer blows to the vehicle with might occur during vehicle repair. Heretofore, these types of tests have been conducted in an unscientific manner. With the existence of a rotary impactor of this invention, these tests can now be conducted more precisely and repeatedly.

Figure 19A:
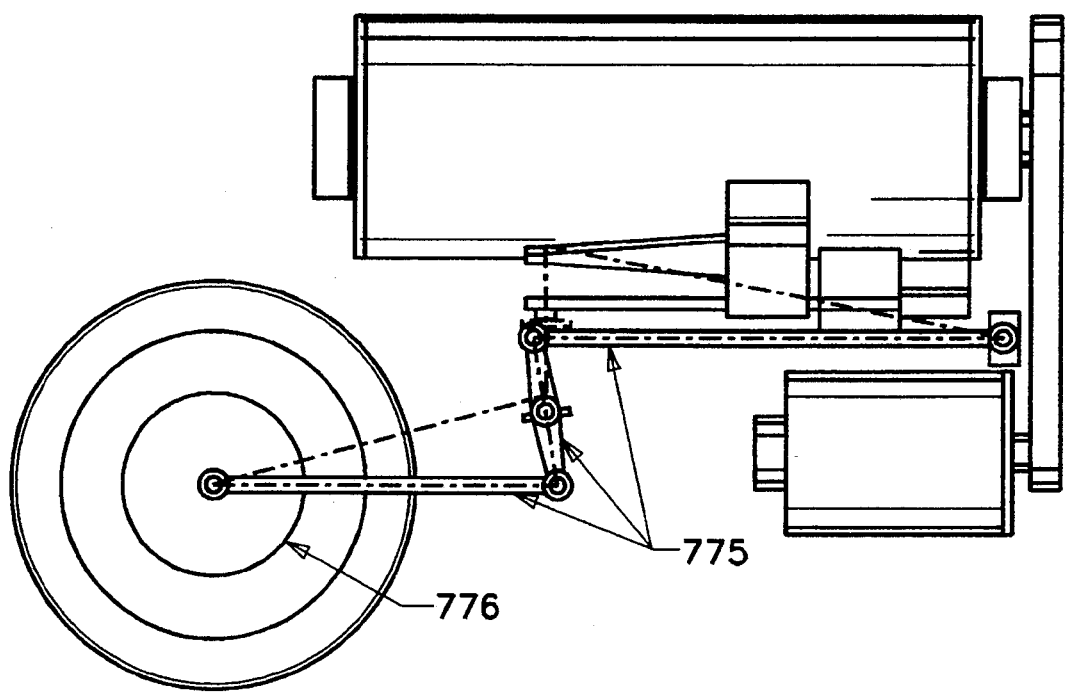
FIG. 19A is a side view of the rotary impact tester, according to this invention, fitted with a four bar linkage in order to alter the motion path of the swivel arm.
Figure 19B:
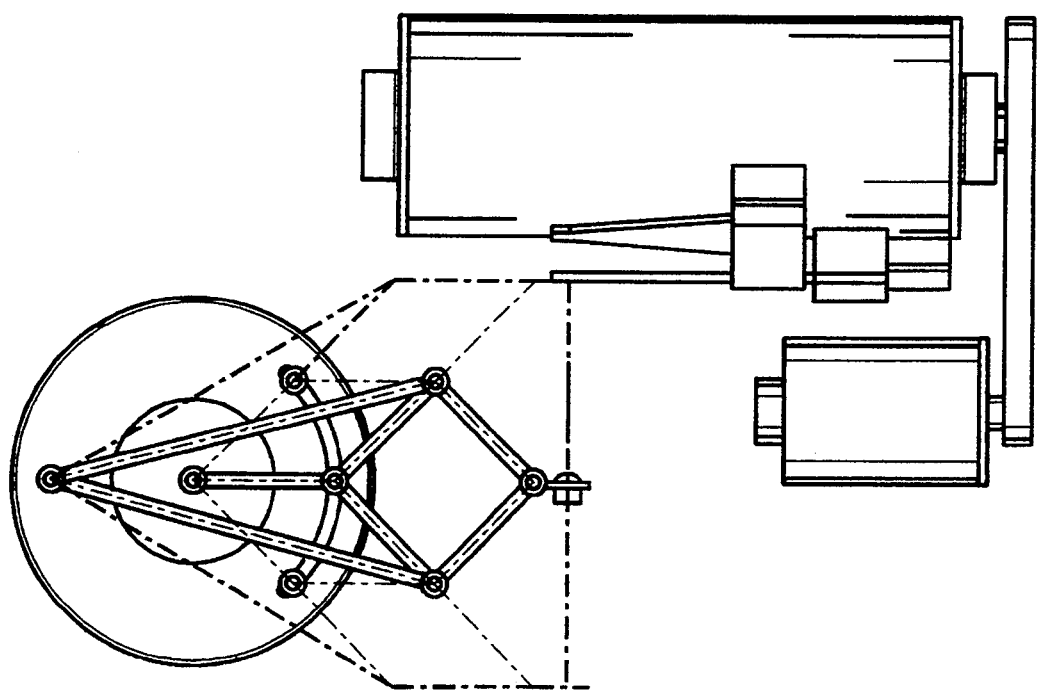
FIG. 19B is a side view, similar to FIG. 19A, showing an alternate linkage design.

All of the applications described heretofore have involved the use of rotary motion. Occasionally it would be desirable if the impactor had a linear rather than rotary motion. For such cases, the impactor arm can be replaced by a rack and pinion gear, a linear slide or the arm can form one bar of a four bar linkage. In addition to linear motion, coupling this device with a four bar linkage results in a device where a controlled servo motor driven arm can produce practically any output motion as determined by the design of the four bar linkage. Obviously, other linkage systems as well as other motion converters could also be used. A four bar linkage 775 coupled with the rotary actuator 776 is shown by example in FIG. 19A, and an alternate linkage system is shown in FIG. 19B.

Figure 20:
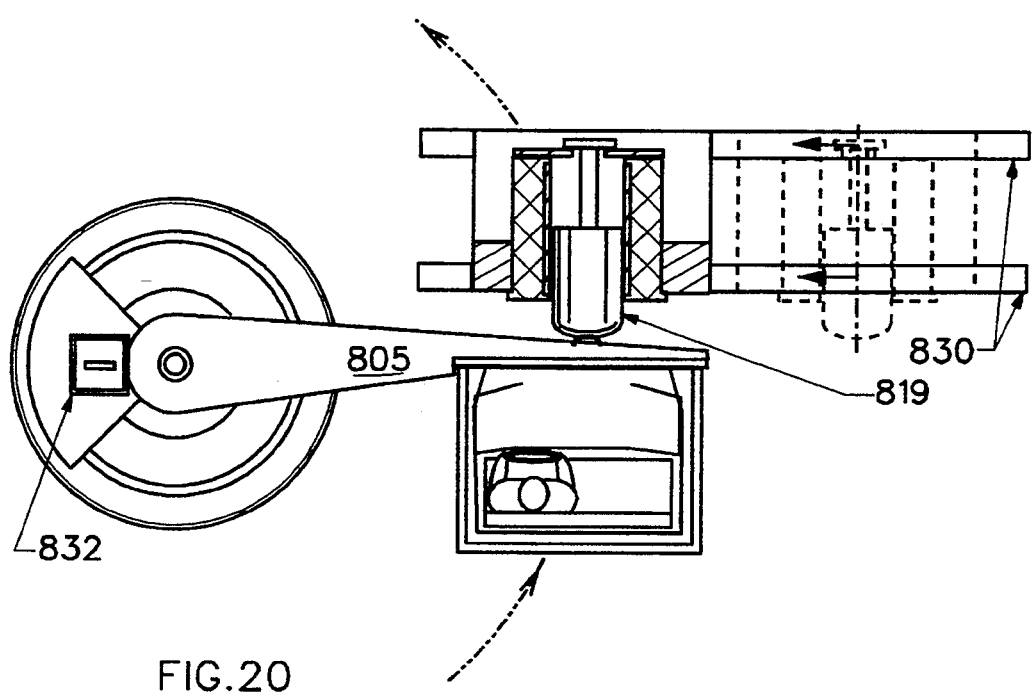
FIG. 20 is a side view of a rotary crash simulator (impact sled), according to this invention, used for evaluating automobile occupant protective systems.

FIG. 20 shows a comparatively large version of the rotary test device which lends itself for use as a crash or impact simulator (impact sled) for testing occupant restraint systems. In this case the arm 805 is six feet long which yields a centrifugal acceleration of about 2.5 G's for a 15 MPH impact, or 0.6 G's if a spring impactor is used to achieve a 15 MPH velocity change. Arm 805 impacts into the impactor shown generally as 819 which can be any of the devices described above depending on the pulse shape desired. Impactor 819 in this case can be mounted onto an actuator slide 830. The sled then could be accelerated over several revolutions in order to achieve velocities as high as 60 MPH, if desired, using a standard geared motor. If the test device is used in this manner, one method would be to mount the data recording equipment on the arm 805, as shown generally as 832, or, alternately, the data can be transferred to a computer using telemetry. In both cases, the need for slip rings is eliminated.

Figure 21:
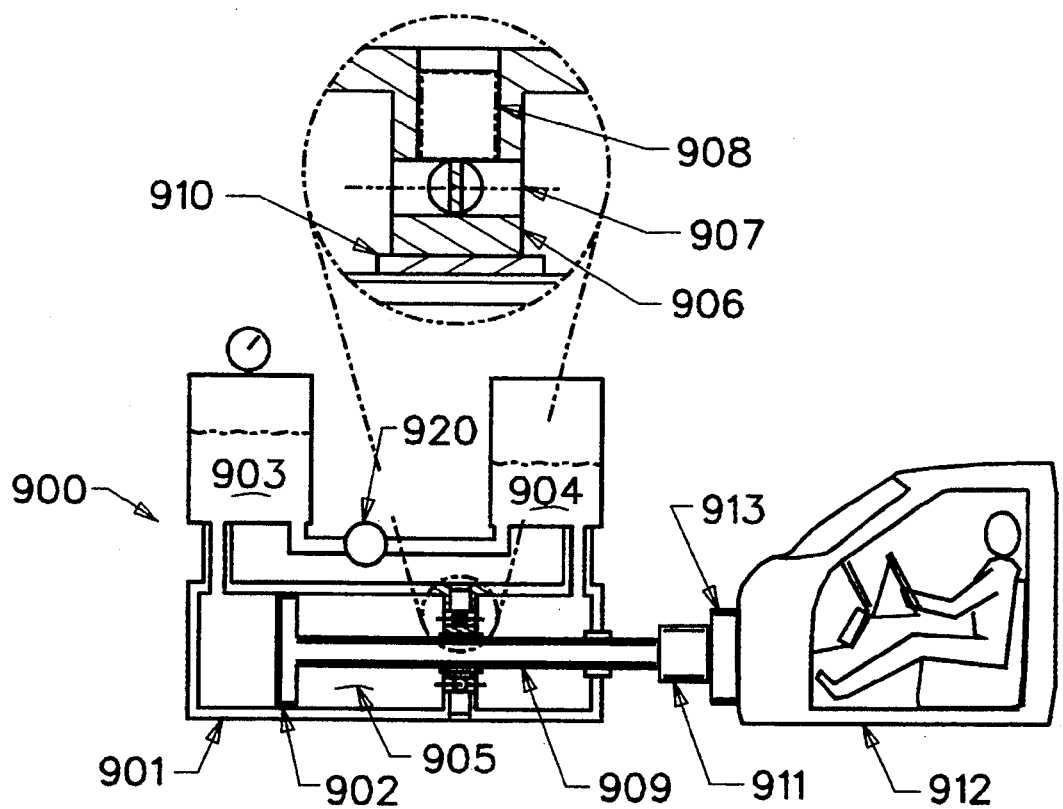
FIG. 21 is a side view of a hydraulic actuator used in conjunction with a passive rotary sled.

FIG. 21 shows an alternative sled wherein an hydraulic actuator is used to accelerate the sled and vehicle buck from rest. A vehicle buck is a portion of a vehicle generally comprising all or part of the front seat and surrounding passenger compartment. At a minimum it consists of a support for a dummy, such as a simulated seat, plus additional apparatus such as a seat belt or steering column and wheel assembly depending on the purpose of the particular test.

The actuator is shown generally as 900 in FIG. 21. It consists of a hydraulic cylinder 901 which contains a piston 902. A hydraulic fluid 905 fills the cylinder and partially fills a high pressure accumulator 903. Piston rod 909 is attached to piston 902 and passes through a piston seal 910 in orifice plate 906. A plurality of orifices 907 in orifice plate 906 provide for controlled fluid flow through orifice plate 906. Each orifice has an associated solenoid valve 908 for controlling the fluid flow through the corresponding orifice. Piston rod 909 interacts with vehicle buck 912 through a pusher plate 913 and rubber member 911. The operation sequence of the hydraulic actuator is as follows. The pressure in accumulator 903 is increased to the appropriate level, by hydraulic pump 920, which causes the pressure in the cylinder to also increase. All of the orifice valves 908 are initially closed which along with the piston seal 911 prevents fluid from flowing past the orifice plate and thus the piston is prevented from moving. The acceleration pulse is started through the opening of one or more of the valves 908. The precise sequence of valve opening is determined by a computer program which attempts to match a particular desired pulse shape. In this manner, sled and vehicle buck 912 is accelerated according to a desired acceleration pulse and the sled begins rotating about the pivot point. The rotary motion is now used to permit several revolutions of the test buck before it is finally stopped. This method results in a much simpler and less expensive sled than the HIGH-G sled manufactured by Bendix. This system has the advantage over the motor design, in that the effects of centrifugal acceleration can be reduced and a simple hydraulic actuator is used in place of the servo motor. Also, since only at most a few revolutions would be required, the data can be transmitted through wires removing the requirement of on board recording or telemetry.

There has thus been shown and described an improved rotary shock and impact testing machine which fulfills all the objects and advantages sought therefor. Many changes, modifications, variations and other uses and applications of the subject invention will, however, become apparent to those skilled in the art after considering this specification and accompanying drawings which disclose the preferred embodiments thereof. All such changes, modifications, variations and other uses and applications which do not depart from the spirit and scope of the invention are intended to be covered by the invention which is limited only by the following claims.

What is claimed is:

1. Apparatus for subjecting a test object to an acceleration pulse of prescribed shape and amplitude, said apparatus comprising:

(a) means for moving said test object at a prescribed speed along a prescribed path; and
 (b) mechanical spring means, arranged in said path, for reversing the direction of motion of said test object, thereby imparting a new velocity to said test object nearly the same as said prescribed speed but in the opposite direction, thereby imparting an acceleration pulse to said test object, said spring means being in the form of a bar having a flat, rectangular cross-section and having two ends, said bar being tapered from one of said ends to the other end, said one end being wider than said other end and being rigidly mounted to a stationary support and the other end being arranged to intercept the movement of said test object along said prescribed path, said spring means having a plurality of characteristic modes of vibration which provide different frequencies of vibration, said spring means being constructed to reverse said direction of motion of said test object at substantially one frequency of vibration.

2. Apparatus for subjecting a test object to an acceleration pulse of prescribed shape and amplitude, said apparatus comprising:

(a) means for moving said test object at a prescribed speed along a prescribed path; and
 (b) mechanical spring means, arranged in said path, for reversing the direction of motion of said test object, thereby imparting a new velocity to said test object nearly the same as said prescribed speed but in the opposite direction, thereby imparting an acceleration pulse to said test object, said spring means being made from heat treated tool steel and having a plurality of characteristic modes of vibration which provide different frequencies of vibration, said spring means being constructed to reverse said direction of motion of said test object at substantially one frequency of vibration.

3. Apparatus for subjecting a test object to an acceleration pulse of prescribed shape and amplitude, said apparatus comprising:

(a) means for moving said test object at a prescribed speed along a prescribed path; and
 (b) mechanical spring means, arranged in said path, for reversing the direction of motion of said test object, thereby imparting a new velocity to said test object nearly the same as said prescribed speed but in the opposite direction, thereby imparting an acceleration pulse to said test object, said spring means comprising graphite fiber reinforced plastic and having a plurality of characteristic modes of vibration which provide different frequencies of vibration, said spring means being constructed to reverse said direction of motion of said test object at substantially one frequency of vibration.

4. Apparatus for subjecting a test object to an acceleration pulse of prescribed shape and amplitude, said apparatus comprising:

(a) means for moving said test object at a prescribed speed along a prescribed path; and
 (b) mechanical spring means, wherein said spring is made from a composite construction including fiber reinforced plastic, arranged in said path, for reversing the direction of motion of said test object, thereby imparting a new velocity to said test object nearly the same as said prescribed speed but in the opposite direction, thereby imparting an acceleration pulse to said test object, said spring means being made from a composite construction including fiber reinforced plastic and having a plurality of characteristic modes of vibration which provide different frequencies of vibration, said spring means being constructed to reverse said direction of motion of said test object at substantially one frequency of vibration.

5. Apparatus for subjecting a test object to an acceleration pulse of prescribed shape and amplitude, said apparatus comprising:
 (a) means for moving said test object at a prescribed speed along a prescribed path; and
 (b) mechanical spring means, arranged in said path, for reversing the direction of motion of said test object, thereby imparting a new velocity to said test object nearly the same as said prescribed speed but in the opposite direction, thereby imparting an acceleration pulse to said test object, said spring means having an I-shaped cross section and being in the form of a bar having two ends, one end of said bar being rigidly mounted to a stationary support and the other end being arranged to intercept the movement of said test object along said prescribed path, said spring means having a plurality of characteristic modes of vibration which provide different frequencies of vibration, said spring means being constructed to reverse said direction of motion of said test object at substantially one frequency of vibration.

6. Apparatus for subjecting a test object to an acceleration pulse of a prescribed shape and amplitude, said apparatus comprising:
 (a) a stationary support providing a pivot point;
 (b) a swivel arm mounted for rotational movement about said pivot point, said arm having a free end adapted for holding a test object;
 (c) a test object to be subjected to an acceleration pulse along a primary axis;
 (d) means for mounting said test object with said primary axis perpendicular to said swing arm;
 (e) electric motor means, arranged on said stationary support and mechanically coupled to said swivel arm, for rotating said swivel arm at a controlled speed; and
 (f) means for changing the speed of said swivel arm at a prescribed rate, thereby to apply an acceleration pulse to said test object.

7. The apparatus defined in claim 6, wherein said electric motor means includes means for varying said speed.

8. The apparatus defined in claim 6, wherein said speed changing means comprises stop means, arranged on said stationary support and disposed in the path of movement of said free end of said arm, for interrupting the rotary movement of said arm.

9. The apparatus defined in claim 8, wherein said stop means applies a prescribed acceleration to said arm.

10. The apparatus defined in claim 9, wherein said stop means includes a dashpot.

11. The apparatus defined in claim 9, wherein said stop means includes a mechanical spring.

12. The apparatus defined in claim 11, wherein said spring is made from high strength steel.

13. The apparatus defined in claim 118, wherein said spring contains graphite reinforced plastic.

14. The apparatus defined in claim 11, wherein said spring is made from a composite structure containing fiber reinforced plastic.

15. The apparatus defined in claim 11, wherein said spring has a plurality of characteristic modes of vibration which provide different frequencies of vibration, said spring being constructed to reverse the direction of motion of said arm at substantially one frequency of vibration.

16. The test apparatus defined in claim 15, wherein said one frequency is the lowest, fundamental frequency of vibration determined by the mass of said swivel arm and said test object and the stiffness of said spring, the other frequencies of vibration having substantially reduced amplitudes and higher frequencies, with respect to said fundamental frequency.

17. The apparatus defined in claim 9, wherein said stop means includes an elastica spring.

18. The apparatus defined in claim 9, wherein said stop means includes band and roller impactor means for controlling the resistance to motion of said swivel arm.

19. The apparatus defined in claim 9, wherein said stop means includes an electromagnetic impactor means for controlling the resistance to motion of said swivel arm.

20. The apparatus defined in claim 19, wherein said electromagnetic impactor means is programmable.

21. The apparatus defined in claim 6, further comprising a motion converter for changing the path of motion of said test object during said acceleration pulse.

22. The apparatus defined in claim 21, wherein said motion converter changes said path of motion from circular to substantially linear during said acceleration pulse.

23. The apparatus defined in claim 21, wherein said motion converter comprises a four bar linkage.

24. The apparatus defined in claim 6, wherein said speed changing means includes pulse converter means for modifying the shape of said acceleration pulse.

25. The apparatus defined in claim 24, wherein said pulse converter means comprises a rubber member adapted to be compressed by said swivel arm.

26. The apparatus defined in claim 6, wherein said shape of said acceleration pulse is substantially in the shape of a half sine.

27. The apparatus defined in claim 6, wherein said shape of said acceleration pulse is substantially in the shape of a haversine.

28. The apparatus defined in claim 6, wherein said speed changing means comprises means to impart said swing arm at an impact point and means to place said impact point proximate to the center of percussion of said swing arm with respect to said pivot point.

29. The apparatus defined in claim 6, further comprising an encoder for determining the angular position of said swivel arm.

30. Apparatus for subjecting a test object to an impact of a prescribed mass and velocity, said apparatus comprising:
 (a) a stationary support providing a pivot point;
 (b) a swivel arm mounted for rotational movement about said pivot point, said arm having a free end adapted for holding an impactor of prescribed shape and mass;
 (c) electric motor means, arranged on said stationary support and mechanically coupled to said swivel arm, for rotating said swivel arm at a controlled speed; and
 (d) mounting means, arranged on said stationary support and adapted to support a test object in the path of movement of the free end of said swivel arm, for interrupting the rotary movement of said swivel arm, whereby said impactor is impacted into said test object.

31. Apparatus for subjecting a test object to an impact against a prescribed stationary impactor, said apparatus comprising:
   (a) a stationary support providing a pivot point;
   (b) a swivel arm mounted for rotational movement about said pivot point, said arm having a free end adapted for holding a test object;
   (c) electric motor means, arranged on said stationary support and mechanically coupled to said swivel arm, for rotating said swivel arm at a controlled speed; and
   (d) impactor means, arranged on said stationary support and disposed in the path of movement of the free end of said swivel arm, for interrupting the rotary movement of said arm, whereby said test object is impacted into said impactor means.

32. Apparatus for subjecting a test object to an acceleration pulse of prescribed shape and amplitude, said apparatus comprising:
   (a) means for moving said test object at a prescribed speed along a prescribed path;
   (b) means for subjecting said test object to an acceleration pulse substantially in the direction of said prescribed path; and
   (c) cross-axis vibration means, arranged to induce a controlled vibration in said test object about an axis perpedicular to said prescribed path.

33. The apparatus defined in claim 32, wherein said cross-axis vibration means comprises an electromagnet and means for exciting said electromagnet at a desired frequency.

34. The apparatus defined in claim 32, wherein said cross-axis vibration means comprises an unbalanced motor.

35. The apparatus defined in claim 32, wherein said means for moving said test object includes a stationary support having a pivot point; a swivel arm mounted for rotational movement about said pivot point, said arm having a free end adapted for holding the test object; and electric motor means, arranged on said stationary support and mechanically coupled to said swivel arm, for rotating said swivel arm at a controlled speed.

36. The apparatus defined in claim 32, wherein said cross-axis vibration means is arranged to induce a controlled vibration in two orthogonal directions.

* * * * *